(12) United States Patent
Weber et al.

(10) Patent No.: US 11,014,827 B2
(45) Date of Patent: May 25, 2021

(54) WATER TREATMENT SYSTEM

(71) Applicant: Access Business Group International LLC, Ada, MI (US)

(72) Inventors: Richard J. Weber, Grand Haven, MI (US); Ryan D. Schamper, Grand Haven, MI (US); Joshua B. Taylor, Rockford, MI (US); Colin J. Moore, Grand Rapids, MI (US); Mario Enriquez, Holland, MI (US)

(73) Assignee: Access Business Group International LLC, Ada, MI (US)

( * ) Notice: Subject to any disclaimer, the term of this patent is extended or adjusted under 35 U.S.C. 154(b) by 125 days.

(21) Appl. No.: 16/565,561

(22) Filed: Sep. 10, 2019

(65) Prior Publication Data

US 2020/0079658 A1 Mar. 12, 2020

Related U.S. Application Data

(60) Provisional application No. 62/729,611, filed on Sep. 11, 2018.

(51) Int. Cl.
*C02F 1/00* (2006.01)
*C02F 1/32* (2006.01)
(Continued)

(52) U.S. Cl.
CPC ............ *C02F 1/002* (2013.01); *B01D 29/605* (2013.01); *B01D 35/30* (2013.01); *C02F 1/008* (2013.01);
(Continued)

(58) Field of Classification Search
CPC .............. A45F 2003/163; A45F 3/18; B01D 2201/204; B01D 2201/304; B01D 29/33; B01D 29/605; B01D 35/30; Y02A 20/212; C02F 1/002; C02F 1/003; C02F 1/008; C02F 1/283; C02F 1/32; C02F 1/325; C02F 2201/004; C02F 2201/009; C02F 2201/3221; C02F 2209/008;
(Continued)

(56) References Cited

U.S. PATENT DOCUMENTS 6,136,188 A 10/2000 Rajan et al.
6,224,764 B1 5/2001 Matyushin et al.
(Continued)

FOREIGN PATENT DOCUMENTS

CN 201436055 4/2010
CN 102070257 5/2011
(Continued)

OTHER PUBLICATIONS

International Search Report and Written Opinion of the International Searching Authority for International Application No. PCT/US2019/050285 dated Oct. 31, 2019.

*Primary Examiner* — Terry K Cecil
(74) *Attorney, Agent, or Firm* — Warner Norcross + Judd LLP

(57) ABSTRACT

A water treatment system is provided with an untreated water reservoir having a cavity through which a filter assembly may traverse such that untreated water in the cavity passes through the filter assembly into a treated water reservoir. Traversal of the filter assembly may be facilitated by a pressure control assembly configured to generate a vacuum.

25 Claims, 19 Drawing Sheets

(51) Int. Cl.
   *B01D 29/60*   (2006.01)
   *B01D 35/30*   (2006.01)

(52) U.S. Cl.
   CPC ........ *C02F 1/325* (2013.01); *B01D 2201/204* (2013.01); *B01D 2201/304* (2013.01); *C02F 2201/004* (2013.01); *C02F 2201/3221* (2013.01); *C02F 2209/03* (2013.01); *C02F 2209/42* (2013.01); *C02F 2209/44* (2013.01); *C02F 2303/04* (2013.01)

(58) Field of Classification Search
   CPC .............. C02F 2209/03; C02F 2209/42; C02F 2209/44; C02F 2209/445; C02F 2301/063; C02F 2303/04; C02F 2307/02
   See application file for complete search history.

(56) References Cited

U.S. PATENT DOCUMENTS

| | | | |
|---|---|---|---|
| 7,306,716 | B2 | 12/2007 | Baarman |
| 8,097,159 | B1 | 1/2012 | Peng |
| 8,128,820 | B2 | 3/2012 | Wu |
| 8,177,966 | B2 | 5/2012 | Wu |
| 8,216,462 | B2 | 7/2012 | O'Brien et al. |
| 8,313,644 | B2 | 11/2012 | Harris et al. |
| 8,318,011 | B2 | 11/2012 | O'Brien et al. |
| 8,394,268 | B2 | 3/2013 | O'Brien et al. |
| 8,425,771 | B2 | 4/2013 | O'Brien et al. |
| 8,852,439 | B2 | 10/2014 | Frauchiger et al. |
| D729,584 | S | 5/2015 | Weston et al. |
| 9,212,067 | B2 * | 12/2015 | Gellibolian ............. C02F 1/002 |
| 9,517,948 | B1 | 12/2016 | Garrett |
| 9,796,600 | B2 | 10/2017 | Shotey et al. |
| 9,828,273 | B2 | 11/2017 | Barlow |
| 9,873,627 | B1 | 1/2018 | Barlow |
| 2006/0163169 | A1 | 7/2006 | Eckhardt et al. |
| 2009/0314703 | A1 | 12/2009 | Beach et al. |
| 2010/0032353 | A1 | 2/2010 | Frandsen |
| 2010/0032358 | A1 | 2/2010 | Vestergaard Frandsen |
| 2014/0008310 | A1 | 1/2014 | Weston et al. |
| 2014/0008311 | A1 | 1/2014 | Weston et al. |
| 2014/0197082 | A1 | 7/2014 | Weston et al. |
| 2017/0066659 | A1 | 3/2017 | Sun |
| 2018/0118597 | A1 | 5/2018 | Bechtold |

FOREIGN PATENT DOCUMENTS

| | | | |
|---|---|---|---|
| CN | 108265784 | 7/2018 | |
| JP | H11-290838 | 10/1999 | |
| KR | 10-0453024 | 10/2004 | |
| KR | 2011-0003101 | 1/2011 | |
| KR | 2011-0133745 | 12/2011 | |
| KR | 10-1597345 | 2/2016 | |
| WO | WO-2018074971 A1 * | 4/2018 | ............. C02F 1/325 |

\* cited by examiner

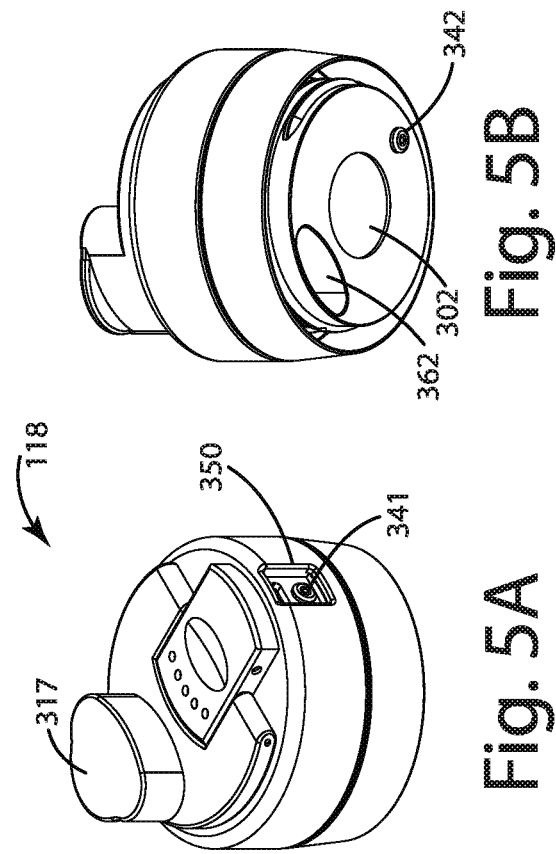
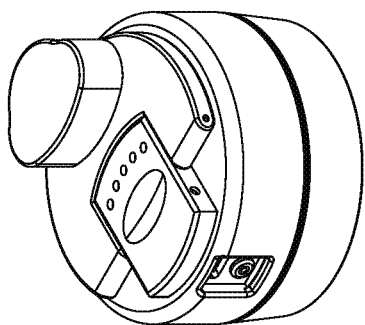
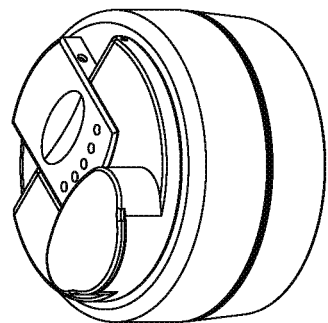
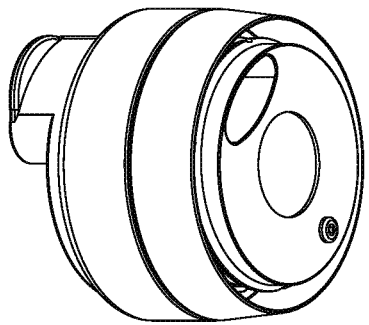
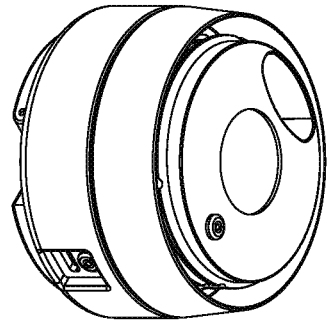
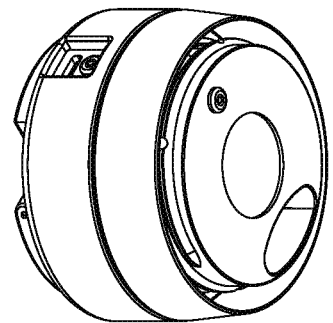
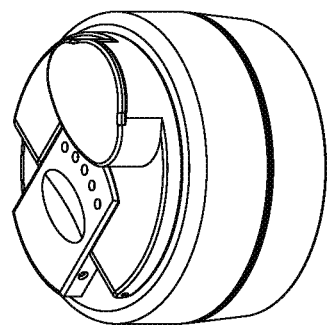
Fig. 5A  Fig. 5B  Fig. 5C  Fig. 5D
Fig. 5E  Fig. 5F  Fig. 5G  Fig. 5H

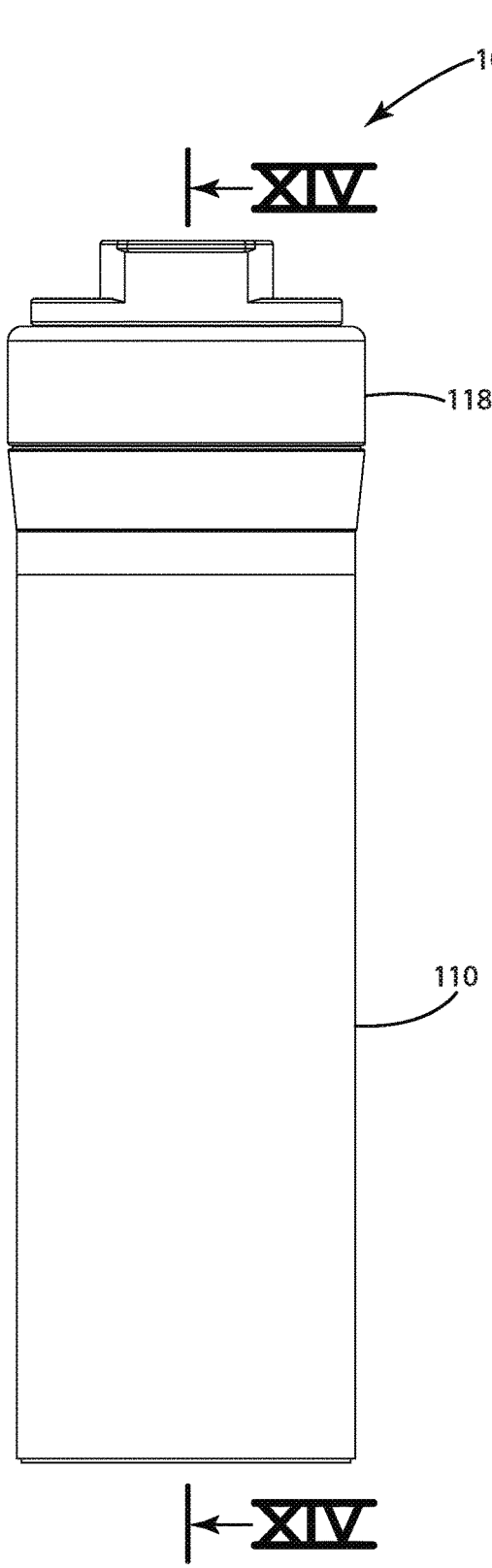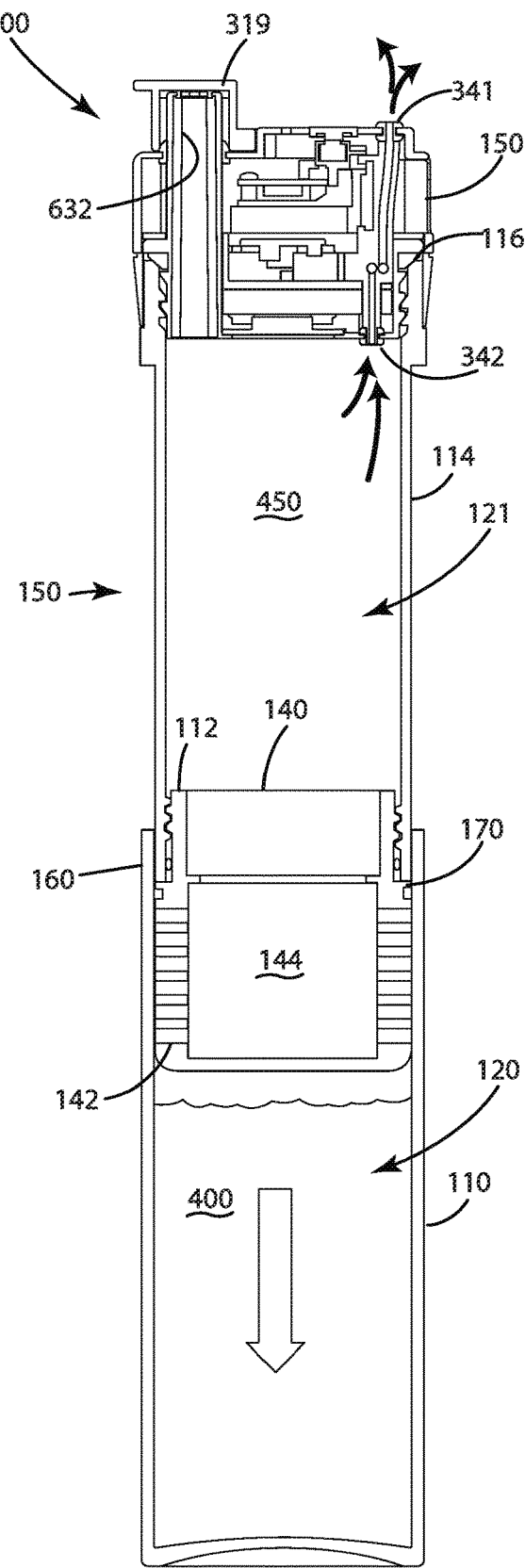
Fig. 13
Fig. 14

WATER TREATMENT SYSTEM

FIELD OF THE INVENTION

The present application relates to an apparatus for filtering water and a method thereof, and more particularly to portable filtration applications.

BACKGROUND

As people move about during their daily activities, access to a trusted clean water source due to where the water originates and how it is supplied by various municipalities can present uncertainties in whether the water is clean for a user. In many cases, anytime a user travels away from a trusted clean water source, these issues can arise.

Today, as people move through their daily activities, they often carry water from a known clean water source (e.g., from home or a trusted source) for personal consumption, or they stop and purchase bottled water from a trusted provider. When people are traveling in parts of the world where the municipal water supply is known or considered to have contaminants or high levels of bacteria, viruses, or protozoan cysts, or a combination thereof, they are often forced to rely on bottled water or packaged soft drinks for hydration.

In many instances, there is no access to a trusted source of clean water or bottled water. As a result, a person may ultimately drink municipality water, potentially risking exposure to gastrointestinal and stomach illnesses like nausea, vomiting, cramps, and diarrhea. This issues can become increasingly prevalent in locations around the world where the municipal water is known to cause stomach upset and access to bottle water is limited.

SUMMARY

The present disclosure relates to a portable water treatment system that purifies and disinfects water for personal hydration. A water treatment system may be provided with an untreated water reservoir having a cavity through which a filter assembly may traverse such that untreated water in the cavity passes through the filter assembly into a treated water reservoir. Traversal of the filter assembly may be facilitated by a pressure control assembly configured to generate a vacuum.

In one embodiment, the water treatment system is provided with an untreated water reservoir, a filter assembly, a treated water reservoir, and a pressure control assembly. The untreated water reservoir may include a cavity defined at least in part by a sidewall, with the cavity capable of holding untreated water. The filter assembly may be adapted to be disposed within the cavity of the untreated water reservoir, and may include an inlet configured to be fluidly coupled with the cavity to receive the untreated water. The filter assembly may also include an outlet configured to discharge treated water.

The treated water reservoir may be configured to store treated water discharged from the filter assembly. The treated water reservoir may include a water reservoir sidewall, a first end opening, and second end opening, with the second end opening of the treated water reservoir being fluidly coupled with the outlet of the filter assembly.

The pressure control assembly may be operably coupled to the first end opening of the treated water reservoir, and may be configured to generate a vacuum in the treated water reservoir to facilitate treatment of the untreated water through the filter assembly to the treated water reservoir. At least one of the filter assembly and the treated water reservoir may move within the cavity of the untreated water reservoir in response to generation of the vacuum.

In one embodiment, a water treatment system is provided with an untreated water reservoir, a filter assembly, a treated water reservoir, and a cap. The untreated water may include a cavity defined at least in part by a sidewall, and may be capable of holding untreated water.

The filter assembly may be adapted to fit within the cavity of the untreated water reservoir, and may include an inlet configured to be fluidly coupled with the cavity to receive the untreated water. The filter assembly may include an outlet configured to discharge treated water.

The treated water reservoir may be configured to store treated water, and may be fluidly coupled with the outlet of the filter assembly. The cap may include a spout for discharging the treated water stored in the treated water reservoir for consumption by a user.

The cap in one embodiment may include a pressure control assembly configured to facilitate generation of a pressure differential between the untreated water reservoir and the treated water reservoir such that the untreated water in the cavity of the untreated water reservoir flows through the filter assembly to the treated water reservoir.

The spout may be sealable to facilitate generation of the pressure differential between the treated water reservoir and the untreated water reservoir.

A water treatment system in one embodiment is provided with an untreated water reservoir configured to receive a main body. The untreated water reservoir may include a cavity defined at least in part by a sidewall and may be capable of holding untreated water.

The main body in one embodiment may include a filter assembly, a treated water reservoir, and a cap. The filter assembly may be adapted to fit within the cavity of the untreated water reservoir, and may include an inlet configured to be fluidly coupled with the cavity to receive the untreated water and an outlet configured to discharge treated water. The treated water reservoir of the main body may be configured to store treated water, and may be fluidly coupled with the outlet of the filter assembly.

The cap of the main body may include a spout for discharging the treated water stored in the treated water reservoir for consumption by a user. The cap may include a UV treatment assembly with a UV light source for disinfecting water.

In one embodiment, the untreated water reservoir is configured to receive a least a portion of the main body within the cavity of the untreated water reservoir, and the untreated water in the untreated water reservoir passes through the filter assembly into the treated water reservoir to allow displacement of the main body into the cavity of the untreated water reservoir.

In one embodiment, the portable water treatment system may provide hydration monitoring and reminders for hydration or filter changes.

In one embodiment, a portable water treatment system is provided that may filter source water by passing the water through carbon and disinfecting the water with an ultraviolet light source to substantially ensure clean drinking water. In one embodiment, the system may supply hydration monitoring and reminders via wireless communications.

In one embodiment, by providing a portable water treatment system that can substantially remove contaminants, bacteria, viruses, and protozoan cysts, the system can provide access to clean water away from local trusted sources.

As a user travels further from home and abroad, access to clean water sources can become increasing difficult to identify. The system in one embodiment may substantially purify local municipal water sources providing substantially clean water regardless of location. Using various wireless communication technologies, hydration information can be conveyed to a user via display on another device, such as a portable smartphone. Alternatively, or additionally, the hydration information can be displayed directly on the portable water treatment system. The hydration information in one embodiment can be utilized to inform the user and provide reminders to users for maintaining enhanced or optimum hydration.

In one embodiment, the portable water treatment system may include an inner sleeve with a screw on bottom carbon filter and a screw on top cap that houses an ultraviolet light source, heat sink, power source (battery), vacuum pump(s), and electronic controls. This top cap also has the capability to sense water volume changes via a level sensor and can correlate this to hydration, provide reminders for hydration or filter changes, and automatic filtration and disinfection control. The top cap may include a user interface including indicators and a treatment button. The top cap may also be configured to provide product information over a wireless link. An outer bottle may hold an amount of untreated water prior to filtering and disinfection.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIGS. 5A-5H show various perspective views of the cap assembly of FIG. 4.

FIG. 13 shows a front view of the water treatment system of FIG. 1.

FIG. 14 shows a sectional view of the water treatment system of FIG. 13 along section line XIV-XIV with a main body of the system being inserted into an untreated water reservoir at an initial position.

DETAILED DESCRIPTION

Figure 1:
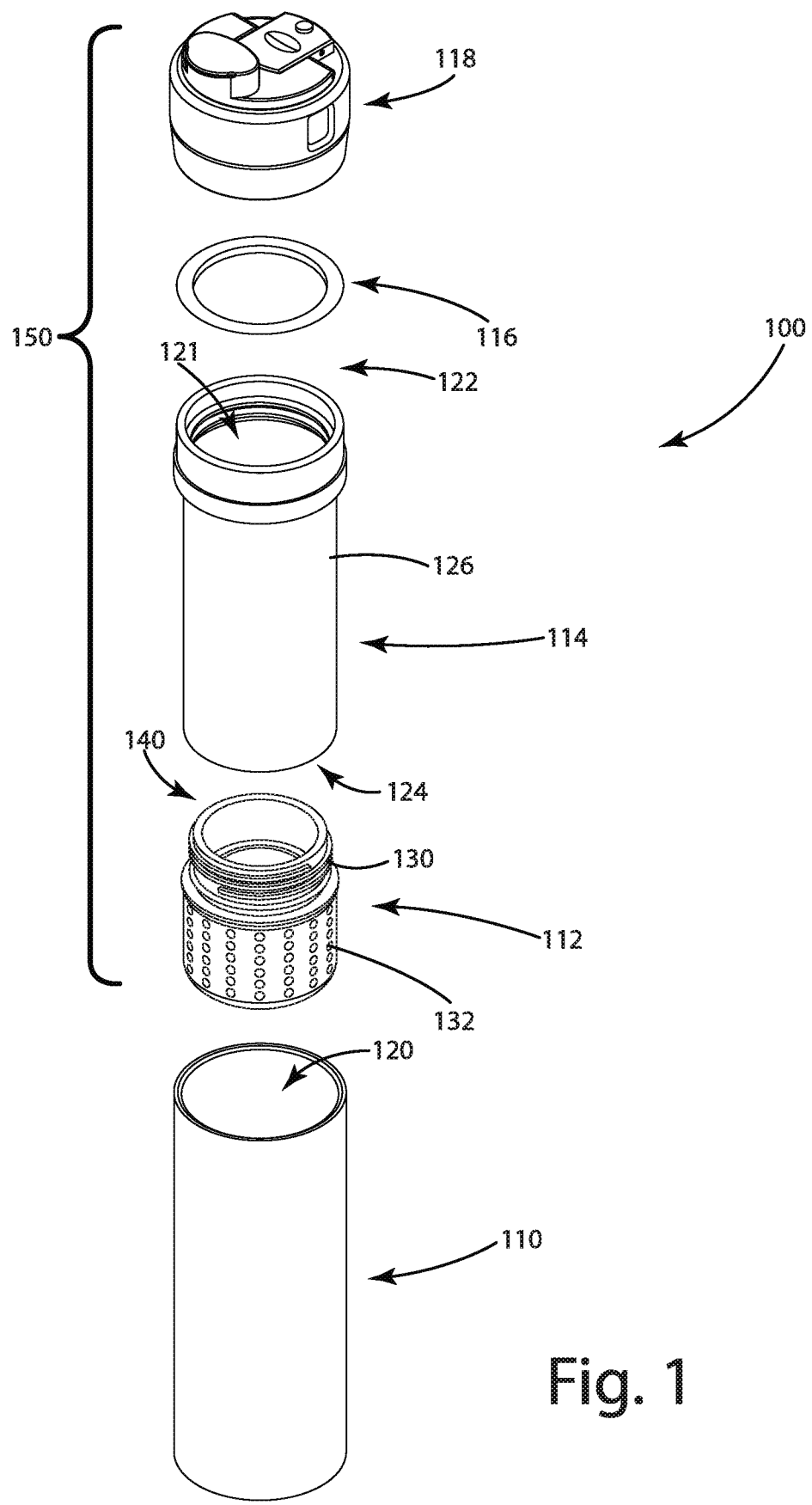
FIG. 1 shows a partially exploded view of a water treatment system in accordance with one embodiment of the present disclosure.

A water treatment system in accordance with one embodiment is shown in FIG. 1 and generally designated 100. The water treatment system 100 may be configured as a portable system capable of providing vacuum assisted filtration of untreated water. In the illustrated embodiment, the water treatment system 100 may include an untreated water reservoir with a cavity through which a filter assembly may traverse such that untreated water in the cavity passes through the filter assembly into a treated water reservoir. The filter assembly may form part of a main body that operates as a plunger assembly that can traverse through the cavity of the untreated water reservoir.

In the illustrated embodiment, the main body or plunger assembly may facilitate engagement of a wiping seal interface that enables vacuum assisted filtration of the untreated water held in the untreated water reservoir. The wiping seal interface may be disposed between the main body and a surface of the untreated water reservoir to form a seal between the cavity of the untreated water reservoir from a surrounding atmosphere. With the wiping seal interface forming such a seal, a vacuum applied to the treated water reservoir may cause untreated water in the untreated water reservoir to pass through the filter assembly to the treated water reservoir, as well as displacement of the main body into the cavity of the untreated water reservoir (e.g., into the space left in the cavity by movement of the untreated water through the filter assembly to the treated water reservoir). A cap for the main body may include a pressure controller capable of generating the vacuum.

VIII. Overview

Figures 11A, 11B, 11C:
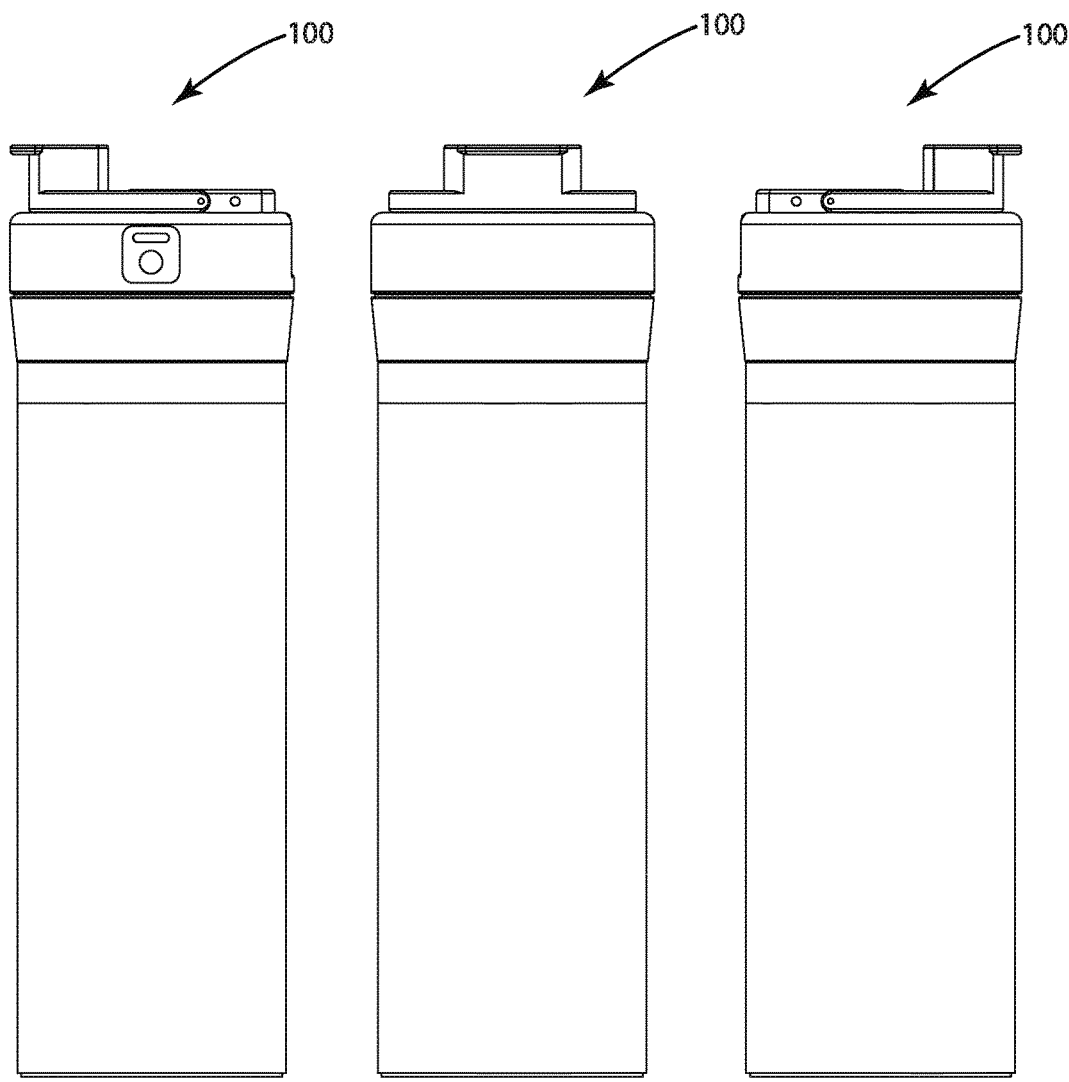
FIGS. 11A-D show various views of the water treatment system of FIG. 1.
Figure 11D:
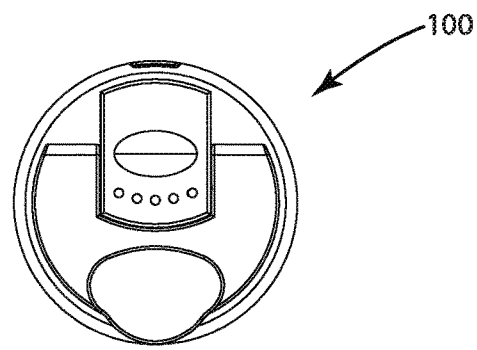
Figures 12A, 12B, 12C, 12D:
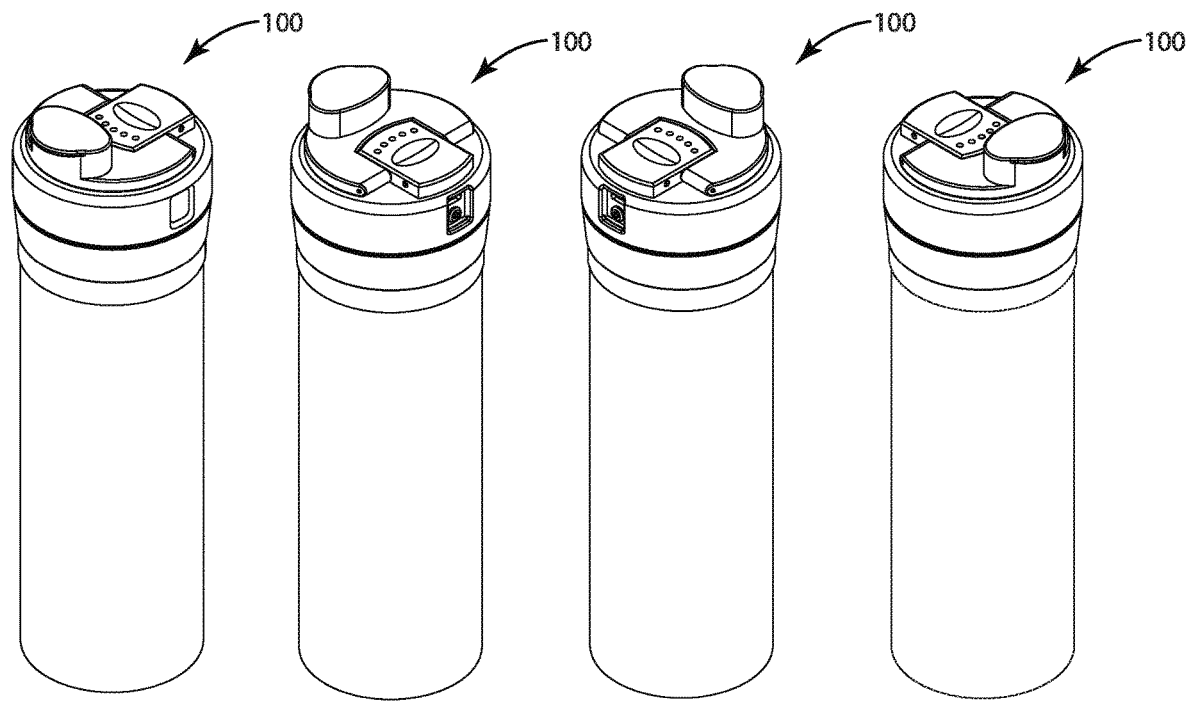
FIGS. 12A-H show perspective views of the water treatment system of FIG. 1.
Figures 12E, 12F, 12G, 12H:
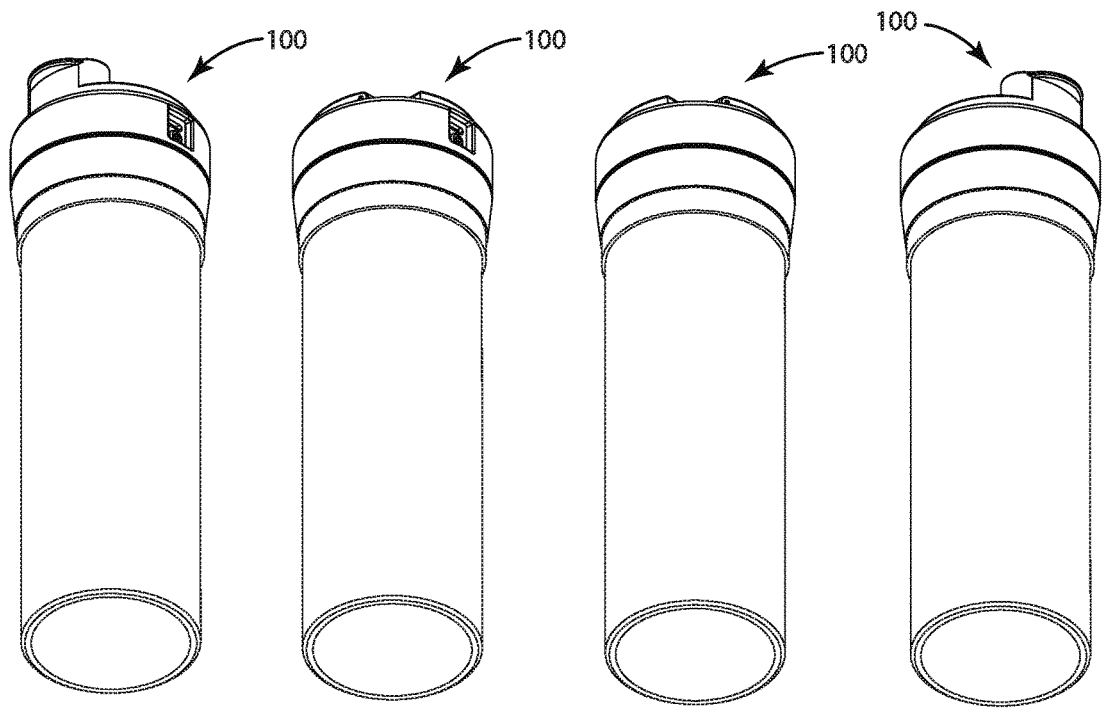

The water treatment system 100 in the illustrated embodiment of FIGS. 1, 11 and 12 includes a main body 150 and an untreated water reservoir 110 (e.g., a bottle or receiver) having a cavity 120 capable of receiving untreated water 400 from a water source. The untreated water reservoir 110 may be formed of any type of material, but in the illustrated embodiment, the untreated water reservoir 110 is formed of ABS via injection molding. Additional example materials include metals (e.g., aluminum or stainless steel), glass, or plastics other than ABS (e.g., polypropylene), or any combination thereof.

The main body 150 of the water treatment system 100 may include a filter assembly 112, a treated water reservoir 114, and a cap assembly 118. The treated water reservoir 114 in the illustrated embodiment may include a hollow cylinder 126 with a first end opening 122 and a second end opening 124, defining a cavity 121 capable of receiving treated water.

The filter assembly 112 in one embodiment may include a filter outlet 140 configured to discharge treated water into the second end opening 124. For instance, the filter outlet 140 of the filter assembly 112 as depicted in FIG. 1 may couple to the second end opening 124 of the treated water reservoir 114. The cap assembly 118 may couple to the first end opening 122 of the treated water reservoir 114. In this arrangement, with the cap assembly 118 coupled to the first end opening 122 and the filter assembly 112 coupled to the second end opening 124, the cavity 121 of the treated water reservoir 114 may hold treated water without substantial spillage.

In the illustrated embodiment, the cap assembly 118 includes a pressure control assembly (not shown in FIG. 1) that is configured to produce a pressure differential between the cavity 121 of the treated water reservoir 114 and the cavity 120 of the untreated water reservoir 110 by generating a vacuum (relative to atmospheric pressure) in the cavity 121 of the treated water reservoir 114. In one embodiment, with the wiping seal interface formed between the main body 150 and an inner wall of the untreated water reservoir 110 (forming a seal from the surrounding atmosphere), untreated water 400 in the untreated water reservoir 110 passes through the filter assembly 112 into the cavity 121 of the treated water reservoir 114 while the main body 150 displaces to fill a void left by transfer of the untreated water 400 in the untreated water reservoir 110.

In the one embodiment, the water treatment system 100 may be constructed such that the cap assembly 118 screws onto the top (i.e., the first end opening 122) of the treated water reservoir 114 (e.g., an inner sleeve) with a top cap gasket 116 disposed therebetween. The filter assembly 112 (e.g. a carbon filter) may screw onto the bottom (i.e., the second end opening 124) of the treated water reservoir 114. The assembled main body 150 may then be placed on top of the untreated water reservoir 110 (e.g. an outer bottle), which is filled to an appropriate level with water to be treated. The main body 150 may be drawn through the untreated water 400 into the cavity 120 of the untreated water reservoir 110 using vacuum pumps and controls disposed in the cap assembly 118.

The treated water in the treated water reservoir 114 in one embodiment may be disinfected by a UV disinfection system disposed in the cap assembly 118.

IX. Control System

The water treatment system 100 in one embodiment may include a control system 200 configured to direct treatment of water held in the untreated water reservoir 110 as well as other operational aspects of the water treatment system 100. The control system 200 may be operably coupled to the pump assembly to control formation of a vacuum in the cavity of the treated water reservoir 114 of the main body 150. The control system 200 may be configured to direct the pump assembly to generate such a vacuum in response to input from a user and based on one or more criteria being satisfied, such as a spout of the cap assembly 118 being sealed and/or an output from an accelerometer being indicative that the water treatment system 100 is upright.

Figure 2:
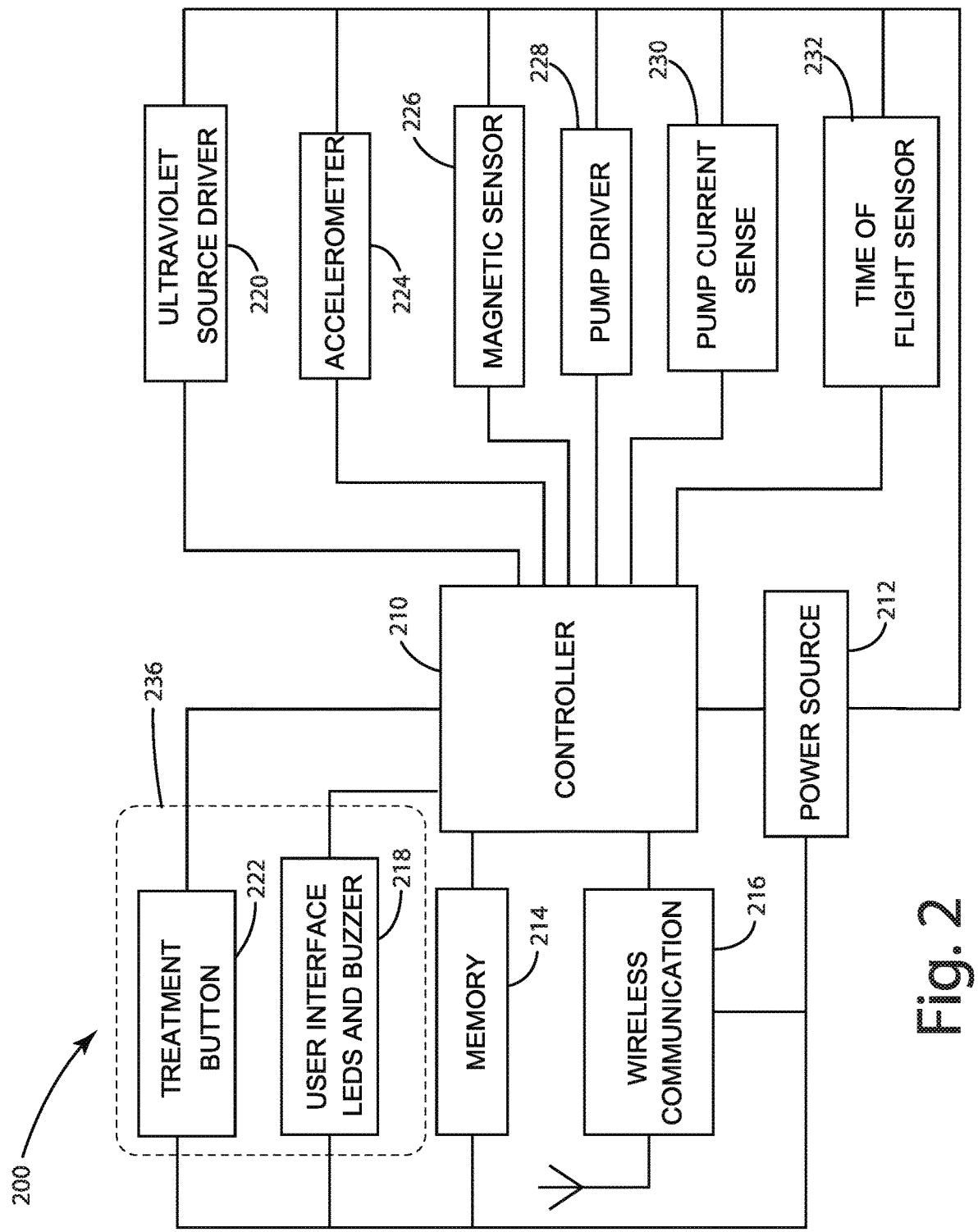
FIG. 2 shows a control system in accordance with one embodiment.

The control system 200 in accordance with one embodiment is shown in FIG. 2. The control system 200 in the illustrated embodiment includes a power source 212 (e.g. a battery), a user interface 236, disinfection circuitry 220, and pump driver circuitry 228 operably coupled to at least one vacuum pump (not shown). The user interface 236 may include user input capabilities or user output capabilities, or both. For example, the user interface 236 may include user input circuitry 222 in the form of a momentary contact switch or a capacitive input circuit that is environmentally sealed from exposure to water and the surrounding atmosphere. In the illustrated embodiment, activation of the user input circuitry 222 may be processed by the controller 210 to initiate a water treatment procedure.

The user interface 236 may also include user feedback circuitry 218, such as one or more LEDs, a piezoelectric buzzer, or a vibratory component, configured to notify the user of one or more states of the water treatment system 100. For instance, the feedback circuitry 218 may indicate that a water treatment procedure is in process, that the power source 212 needs to be charged or replaced, that a water treatment procedure is complete, or that a fault condition has occurred with respect to a water treatment procedure, or a combination thereof.

The disinfection circuitry 220 may be operably coupled to a UV light source, as discussed herein, to facilitate UV disinfection of water stored in the water treatment system 100. In one embodiment, as discussed herein, the UV light source may disinfect the treated water stored in the cavity 121 of the treated water reservoir 114. The disinfection circuitry 220 may be configured to energize the UV light source in response to a directive from the controller 210. The disinfection circuitry 220 in one embodiment may include feedback circuitry capable of providing output indicative of a condition of the UV light source, such as whether the UV light source has failed, if the output of the UV light source has deteriorated, or if the output of the UV light source has deviated from a target output. This output may be utilized by the disinfection circuitry 220 to adjust an operational parameter of the UV light source to achieve a target output, or to provide feedback to the controller 210, or both.

The pump driver circuitry 228 may include one or more switches capable of providing sufficient power to the at least one vacuum pump to generate a vacuum in the cavity 121 of the treated water reservoir 114. For instance, the driver circuitry 228 may include a MOSFET capable of delivering current at a target voltage for the vacuum pump to operate. The DC voltage of power supplied to the vacuum pump may be controlled or adjusted to control the operational speed of the vacuum pump. For instance, the vacuum pump may include a brushed DC motor with a speed corresponding to a voltage supplied to the motor. Alternatively, the power supplied to the vacuum pump may be pulse width modulated to increase or decrease the overall amount of power supplied to the vacuum pump, thereby controlling an operational speed of the vacuum pump. In one embodiment, the vacuum pump may include a brushless DC motor.

The control system 200 in the illustrated embodiment includes a controller 210, memory 214, a power source 212, and a communication interface 216. The controller 210 may be configured to communicate with an external device via the communication interface 216, which may be wired or wireless, or a combination thereof. For instance, in one embodiment, the communication interface 216 may include a Bluetooth Low Energy (BTLE) wireless transceiver and a USB wired interface. In the illustrated embodiment, the communication interface 216 includes a BTLE transceiver without a USB wired interface for communication; rather, a USB interface is provided to receive power from an external device via USB without communication capabilities. It should be understood, however, that the control system 200 may be configured to communicate differently, including any type of wireless or wired configurations, or any combination thereof.

The controller 210 may be operably coupled to at least one sensor configured to detect a state or condition of the water treatment system 100. Example sensors include the following: a level sensor (e.g., an infrared level sensor) configured to detect or provide an output indicative of a level of treated water in the treated water reservoir 114; a vacuum pump sensor configured to provide output indicative of a load of a vacuum pump (e.g., the sensor may provide an output, such as current to a pump motor, that decreases as the suction load on the pump decrease due to less gas in the treated water reservoir 114; an orientation sensor (such as an accelerometer) configured to provide an output indicative of whether the water treatment system 100 is upright or aligned with the force of gravity. In the illustrated embodiment, the controller 210 is operably coupled to a plurality of such sensors, including a level sensor 232, a vacuum pump sensor 230, and an orientation sensor 224. Although more or fewer sensors may be utilized, depending on the application, the sensors may be utilized in one embodiment of the present disclosure to facilitate treatment of water and displacement of the main body 150 relative to the cavity 120 of the untreated water reservoir 110.

As an example, output from the orientation sensor 224 may be processed by the controller 210 to ensure that the water treatment system 100 is generally upright as a vacuum pump is energized to form a vacuum in the treated water reservoir 114, generating a pressure differential between the treated water reservoir 114 in the untreated water reservoir 110 to displace both untreated water and the main body 150. If the water treatment system 100 is not upright while the vacuum pump is energized, there is a possibility that treated water rather than gas may be evacuated from the treated water reservoir 114.

Sensor output from the vacuum pump sensor 230 may be analyzed by the controller 210 to determine if treatment of the untreated water from the untreated water reservoir 110 is complete. For instance, if the output from the vacuum pump sensor 230 is indicative of the load on the vacuum pump having a value less than a threshold, being at a rate less than a threshold, or having an acceleration that is less than a threshold, or a combination thereof, the controller 210 may determine that no further substantial amount of untreated water may be sucked through the filter assembly 112 into the treated water reservoir 114, and that no further substantial amount of displacement may be achieved between the main body 150 and the cavity 120 of the untreated water reservoir 110.

Sensor output from the level sensor 232 may also be indicative that treatment of the untreated water is complete. For instance, if the sensor output from the level sensor 232 indicates that a level of the treated water in the treated water reservoir 114 transitions from a changing level state to a substantially constant level state, the controller 210 may determine that no further amount of untreated water may be processed through the filter assembly 112 via formation of a vacuum in the cavity 121 of the treated water reservoir 114.

Sensor output from the level sensor 232 may also be indicative of whether a seal is formed between the untreated water reservoir 110 and the surrounding atmosphere via the wiping seal interface. To provide an example, if no such seal is formed, despite presence of untreated water in the cavity 120 of the untreated water reservoir 110, energizing the vacuum pump to form a vacuum in the treated water reservoir 114 may yield no substantial change in the level of treated water in the treated water reservoir 114. This lack of substantial change may result from there being no substantial pressure differential between the cavity 121 of the treated water reservoir 114 and the cavity 120 of the untreated water reservoir 110. In other words, without formation of the seal between the cavity 120 and the surrounding atmosphere, attempts to form a vacuum in the cavity 121 of the treated water reservoir 114 may simply pull gas (e.g., air) from the surrounding atmosphere through the filter assembly 112 into the cavity 121, yielding little to no pressure differential between the two cavities 120, 121 and little to no drop in pressure in the cavity 121 relative to atmospheric pressure. As a result, untreated water in the cavity 120 of the untreated water reservoir 110 may remain substantially in place.

As discussed herein, in one embodiment, formation of a vacuum in the cavity 121 of the treated water reservoir 114 may be facilitated by closure of a spout configured to discharge water for consumption by a user. The spout may provide a discharge path for treated water from the treated water reservoir 114 that is in fluid communication with the surrounding atmosphere; if the spout is left in an open position, this fluid communication with the surrounding atmosphere may potentially prevent formation of a vacuum in the treated water reservoir 114. The spout may be sealed in one embodiment to facilitate formation of the vacuum. A spout sensor 226, such as a magnetic proximity sensor, may be coupled to the spout to enable detection of whether the spout is in an open or closed state. For instance, as discussed herein, the spout may include a lid with a magnet disposed therein that can be operable to seal against the spout in a closed position or operable to an unsealed position such that the spout is open for discharge of treated water. The spout sensor 226, such as a Hall effect sensor, may be disposed near the spout to detect whether the magnet is proximal to the spout in a closed state or absent such that the spout is in an open state for discharge of treated water to a user for consumption.

The control system 200 may include any and all electrical circuitry and components to carry out the functions and algorithms described herein. Generally speaking, the control system 200 may include one or more microcontrollers, microprocessors, and/or other programmable electronics that are programmed to carry out the functions described herein. The control system 200 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the water treatment system 100, or they may reside in a common location within the water treatment system 100. When physically distributed, the components may communicate using any suitable serial or parallel communication protocol, such as, but not limited to, CAN, LIN, FireWire, I2C, RS-232, RS-485, and Universal Serial Bus (USB).

As described herein, the term module designates parts of the control system 200. For instance, a module in one embodiment may be stored in memory of the control system 200, and may also form part of the controller configuration such that the module is part of the controller that is configured to operate to receive and translate one or more inputs and to output one or more outputs.

X. Method of Control System Operation

Figure 3:
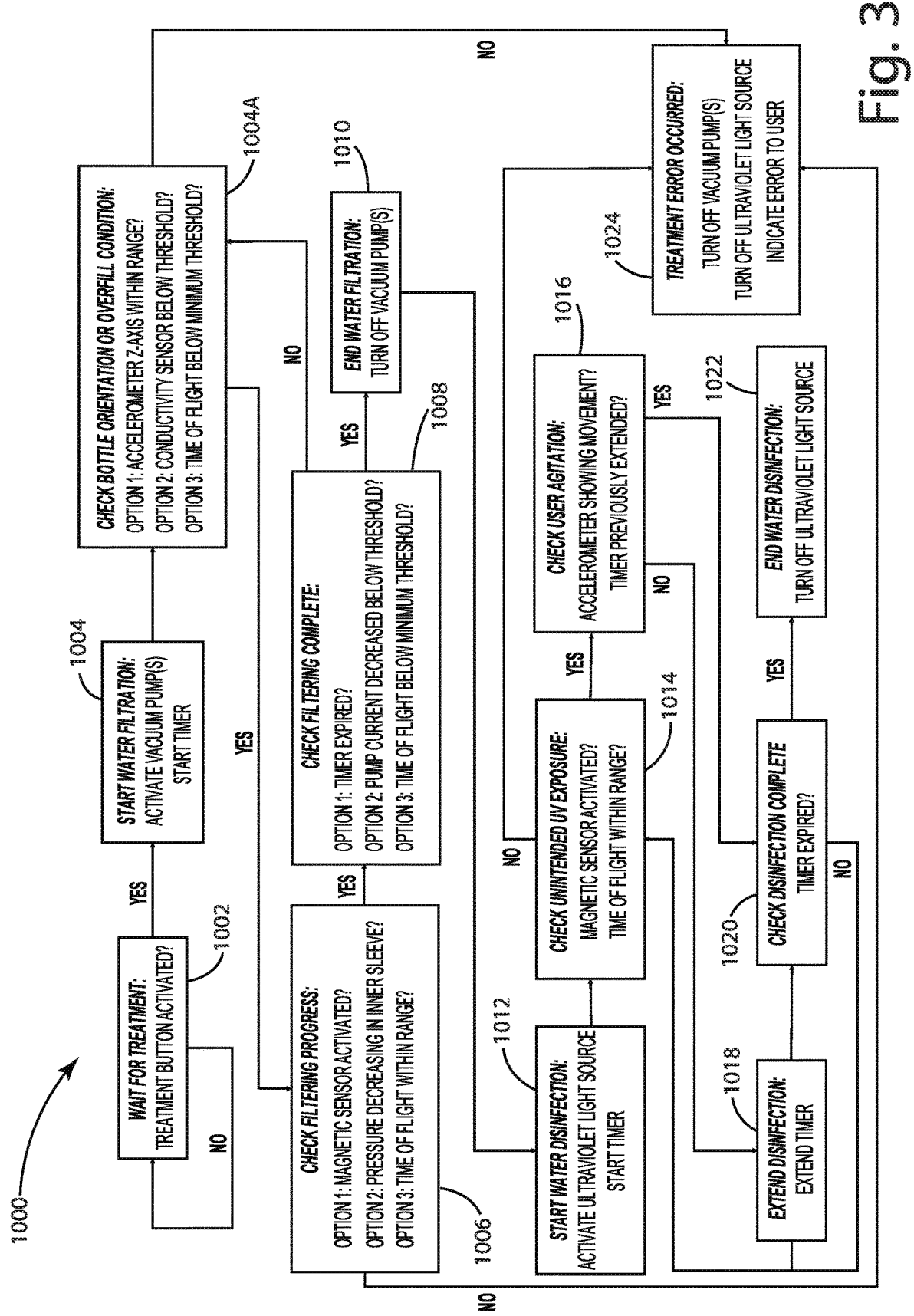
FIG. 3 shows a method of operation in accordance with one embodiment.

In one embodiment, the control system 200 may be configured to operate the water treatment system 100 in accordance with the method 1000 depicted in FIG. 3. The method 1000 may include waiting in a Wait for Treatment state for user input to initiate a treatment procedure. Step 1002. The user input may be provided via the user input circuitry 222, such as via a switch that can be activated by a finger of the user. In the Wait for Treatment state, the controller 210 of the control system 200 may check to determine if a user has provided input via the user input circuitry 222, such as by activating a Treatment Button. If the Treatment Button has been activated the controller 210 may activate one or more vacuum pumps via the pump driver circuitry 228 and may start a timer. Step 1004.

Next, the controller 210 may perform several checks during the pump active time to detect potential unsafe or error conditions. These checks may be conducted during a Check Bottle Orientation and Overfill state. Step 1004A. In this state, the controller 210 may attempt to determine if the untreated water reservoir 110 has been overfilled with untreated water or is not oriented correctly. For example, overfilling the untreated water reservoir 110, laying sideways or inverting the untreated water reservoir 110 and main body 150 during the vacuum pump operation may cause water to be sucked into an inlet port of the one or more vacuum pumps and potentially expelled from an outlet port of the one or more vacuum pumps, in essence creating a squirt gun.

The controller 210 may determine an overfill state by monitoring the water depth within the treated water reservoir 114 based on output from the level sensor 232 (e.g., a time of flight [TOF] sensor). If the water depth is or becomes too big (distance determined by the TOF being too small), water may reach the inlet port of the one or more vacuum pumps. Additionally, or alternatively, the level sensor 232 may be monitored to determine if no level changes are detected despite activation of one or more vacuum pumps, indicating that a fault condition may have occurred, such as a clogged component, a failed seal, or an unformed seal, or a combination thereof.

Additionally, or alternatively, the controller 210 may monitor the orientation sensor 224 (e.g., the accelerometer) to determine z-axis orientation and either prevent the one or more vacuum pumps from turning on or quickly turn them off if the orientation sensor 224 provides z-axis readings that exceed a threshold.

Yet still additionally or alternatively, a conductivity measurement near the inlet port may be conducted to detect water and, if detected, substantially prevent the pumping of water. If one or more of these conditions occurs, the controller 210 may receive sensor feedback accordingly and determine to transition to a Treatment Error Occurred state, turn off the one or more vacuum pumps, and alert the error to the user via the user feedback circuitry 218. Step 1004A.

In an alternative embodiment, Step 1004A may be omitted. Materials covering the input port of the one or more vacuum pumps may be constructed to be permeable to air while being substantially impermeable to water (such as Gore-Tex). This way, detection of orientation in case the water treatment system 100 is disposed to cover the input port with water is substantially unnecessary to operate an a manner that avoids becoming a squirt gun.

In a Check Filtering Progress state, the controller 210 may attempt to determine if the main body 150 is not properly seated into the untreated water reservoir 110 or if a lid of the main body 150 is not properly seated over the spout. Step 1006. In the illustrated embodiment, either one of these conditions may prevent a vacuum from being created when the one or more vacuum pumps are enabled. It is noted that, in some circumstances, it can take more than 30 seconds to generate a vacuum in the treated water reservoir 114 and consequently pull the main body 150 fully into the cavity 120 of the untreated water reservoir 110. After activating the one or more pumps, the controller 210 may monitor the level sensor 232 to ensure the water depth within the cavity 121 of the treated water reservoir 114 is increasing at the appropriate rate. If the water depth is below the desired threshold at a specified time interval, the controller 210 may transition to a Treatment Error Occurred state, turn off the one or more vacuum pumps, and indicate the error condition to the user through the user feedback circuitry 218, such as through User Interface LEDs or a Buzzer, and via the communication interface 216, such as a wireless communication link. Step 1024.

Additionally, or alternatively, the controller 210 may attempt to determine the position of the lid on the spout (if it contains a magnet) by monitoring the spout sensor 226 (e.g., magnetic sensor). If the lid is not fully seated, it may prevent a vacuum from forming within the cavity 121 of the main body 150. Yet still additionally, or alternatively, a pressure sensor may be provided inside cavity 121 to determine if a seal has been formed or remains present relative to surrounding atmosphere. If the level of pressure is above a target threshold at a specified time interval, the controller 210 may again indicate the error condition to the user through the user feedback circuitry 218 and/or the communication interface 216.

In a Check Filtering Complete state, the controller 210 may attempt to determine when to turn off the one or more vacuum pumps. Step 1008. In the illustrated embodiment, the controller 210 may turn off the one or more vacuum pumps at a predetermined period of time after the treatment button has been pressed. Alternatively, the controller 210 may monitor (potentially continuously) the pump load via the pump load sensor 230, such as by monitoring current flowing through the one or more pumps, while the one or more pumps are active. When the main body 150 is fully received within the cavity 120 of the untreated water reservoir 110, the load on the pumps may change causing the current through the one or more pumps to decrease. This decrease in current may be indicated by the load sensor 230 to the controller 210 and used as a basis by the controller 210 to determine to direct the driver circuitry 228 to de-energize the one or more vacuum pumps.

Additionally, or alternatively, the controller 210 may monitor the depth of the water inside cavity 121 of the treated water reservoir 114 by monitoring (potentially continuously) the level sensor 232 (e.g., the TOF sensor). When the water depth reaches a pre-defined threshold, the controller 210 may determine to direct the driver circuitry 228 to de-energize or turn off the one or more vacuum pumps.

After the filtration process is complete at step 1010, the controller 210 may transition to a Start Water Disinfection state and activate the UV light source to disinfect the water. Step 1012. The UV light source may be activated for a specified amount of time, or the UV light source may be activated for a dynamically determined amount of time based on feedback from a light sensor indicative of an amount of light energy supply to the water.

The controller 210 may then transition to the Check Unintended UV Exposure state to attempt to substantially ensure that the user does not become exposed to a significant amount of light energy from the UV light source. Step 1014. For instance, the controller 210 may determine if the top cap is located in position on top of the main body 150 by using output from the level sensor 232 to determine if the ultraviolet source is still within the presence of water. If the level sensor 232 measures a distance beyond an expected distance to be seen by typical water levels during treatment, the controller 210 may transition to the Treatment Error Occurred state and shut down the UV light source. Step 1024.

Potential ultraviolet exposure may also occur if the lid on top of the spout is in the open position. The controller 210 may try to determine the position of the lid on the spout by monitoring the spout sensor 226, such as by monitoring if a magnet in the lid can be sensed by the spout sensor 226. If the lid is opened so that the spout is capable of discharging fluid, the controller 210 may transition to the Treatment Error Occurred state and shut down the UV light source. Step 1024.

In one embodiment, to shorten the disinfection time by ensuring more uniform water mixing and ultraviolet light exposure, the user may be prompted to agitate the water treatment system 100 by shaking or inverting the water treatment system 100 repeatedly. Step 1016. In a Check User Agitation state, the controller 210 may monitor an accelerometer (e.g., an orientation sensor 224 to detect acceleration) to determine if a target level of agitation has taken place or if the disinfection time has already been extended. If the controller 210 determines the user has not agitated the water treatment system 100, the controller 210 may transition to an Extend Disinfection state and lengthen the disinfection time. Step 1018. The controller 210 may also alert the user through the user interface circuitry 236 and/or the communication interface 216 (e.g., a wireless communication link) that it is now time to agitate the water treatment system 100.

The controller 210 may transition to the Check Disinfection Complete state to determine if the treatment process is complete. Step 1020. This may be performed by determining if a disinfection timer has expired. If the timer expires, the controller 210 may transition to an End Water Disinfection state and turns off the UV light source. Step 1022.

XI. Top Cap Assembly

The top cap assembly 118 in one embodiment of the present disclosure is shown in further detail in FIGS. 4-10.

The top cap assembly 118, as mentioned herein, may include a pressure control assembly 340, a control system 200, and a UV treatment assembly 348. The top cap assembly 118 may be configured to removably couple to the treated water reservoir 114. The top cap assembly 118 may fluidly seal a first end opening 122 of the treated water reservoir 114 to substantially prevent spillage of treated water from the cavity 121 of the treated water reservoir 114 and enable transfer of treated water from a cavity 121 to a user for consumption. For instance, the top cap assembly 118 may include threads that engage corresponding threads provided about the first end opening 122 of the treated water reservoir 114. A top cap gasket 116 may be disposed between the top cap assembly 118 and the first end opening 122 of the treated water reservoir 114 to facilitate formation of a watertight seal therebetween.

The top cap assembly 118 in the illustrated embodiment may direct the treatment of water within the water treatment system 100. The top cap assembly 118 may be configured to provide access to treated water for consumption by a user and to provide vacuum assisted treatment of water for such consumption. This way, the top cap assembly 118 may form a self-contained system for controlling water treatment via vacuum assist and discharging treated water to a user for consumption.

Figure 4:
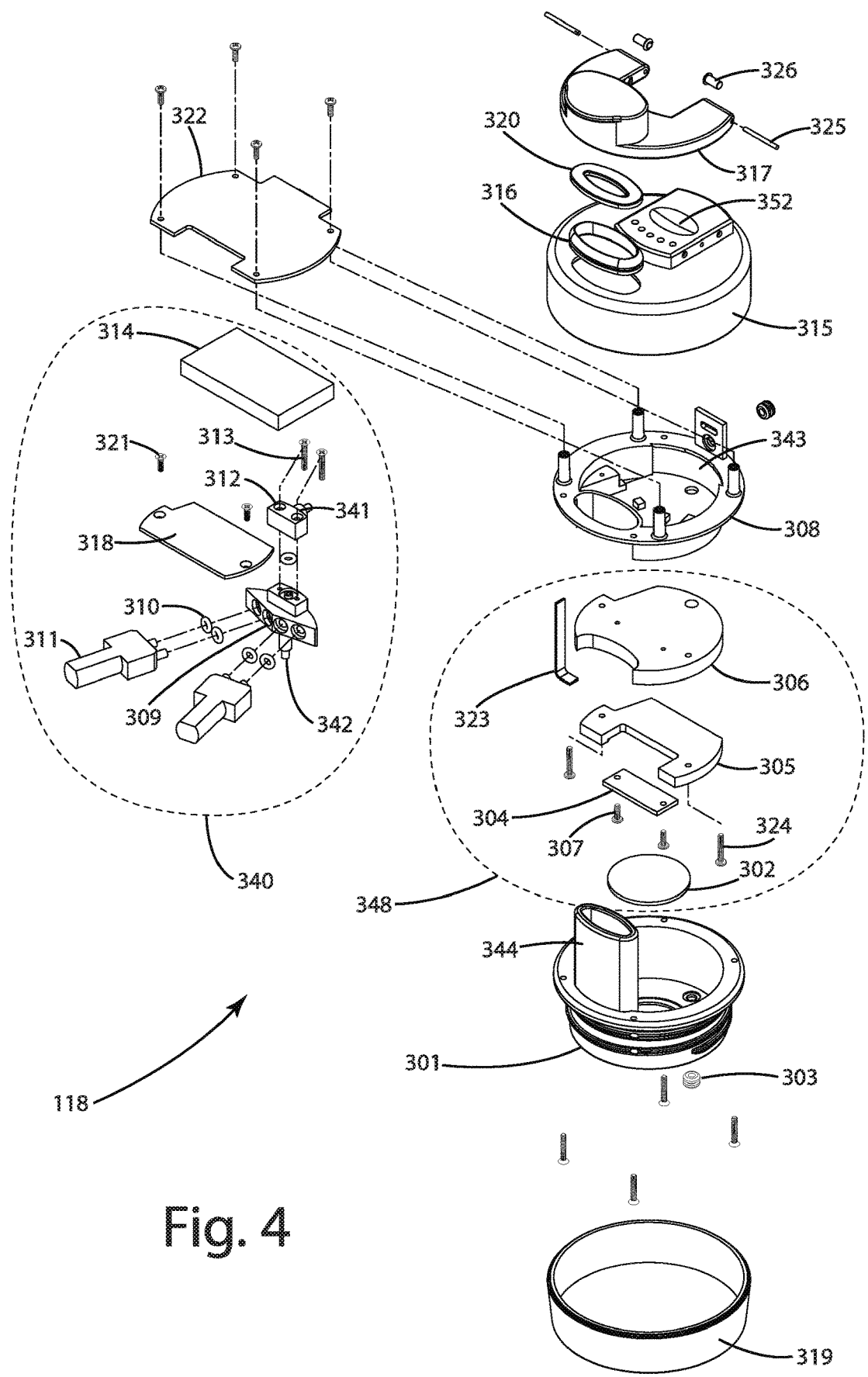
FIG. 4 depicts an exploded view of a cap assembly in accordance with one embodiment.
Figure 6:
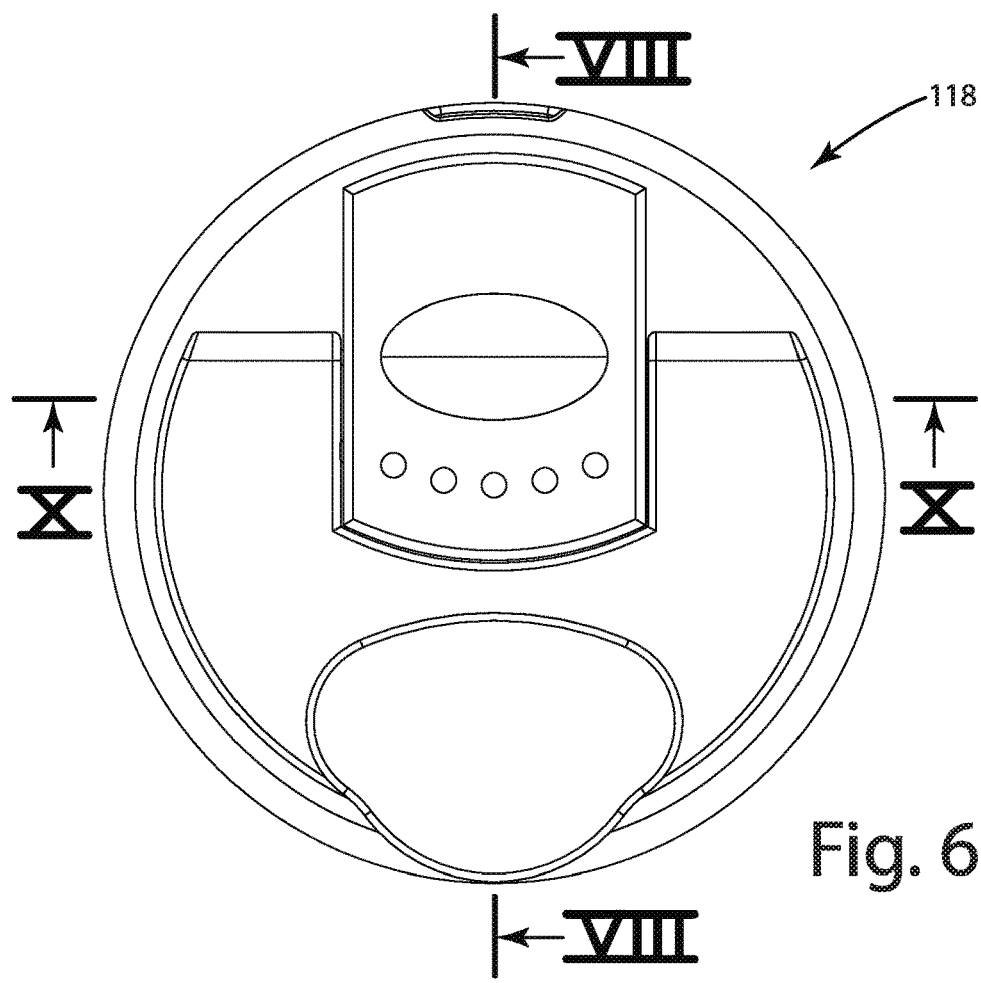
FIG. 6 depicts a top view of the cap assembly of FIG. 4.
Figure 7:
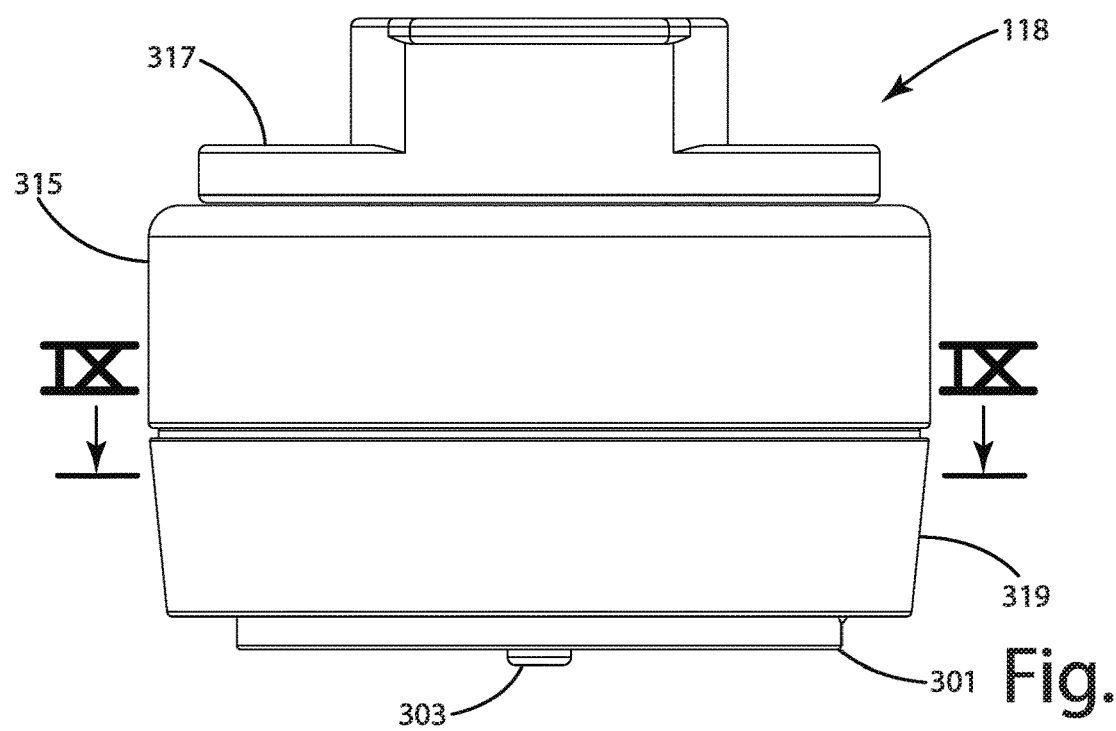
FIG. 7 shows a front view of the cap assembly of FIG. 4.

The pressure control assembly of the top cap assembly 118 is depicted in the illustrated embodiment of FIG. 4 and generally designated 340. The pressure control assembly 340 may include first and second vacuum pumps 311A, 311B coupled to a pump manifold 309. Each of the first and second vacuum pumps 311A, 311B may include an inlet and outlet, each being coupled to a corresponding inlet or outlet of the pump manifold 309. The interfaces between the first and second vacuum pumps 311A, 311B and the inlets and outlets of the pump manifold 309 may include an O-rings 310 may form an air and water tight seal. It should be noted that more or less than two vacuum pumps may be provided in the system.

The pump manifold 309 may include a pump assembly input 342 that is arranged to interface with the first end opening 122 of the treated water reservoir 114 to suck gas 450 from within the cavity 121 of the treated water reservoir 114 in response to activation of the first and second pumps 311A, 311B. The pump assembly input 342 may be communicatively coupled to the respective inlets of the first and second vacuum pumps 311A, 311B via the pump manifold 309. As discussed herein, if fluid, such as water, comes in contact with the pump assembly input 342 while the first and second pumps 311A, 311B are energized, the fluid may be sucked through the pump manifold 309, through the first and second pumps 311A, 311B, and out the pump manifold 309 to the surrounding atmosphere. Alternatively, a gas permeable barrier that is substantially impervious to liquid may be disposed on the pump assembly input 342 to substantially prevent suction up fluid through the pump manifold 309.

The pump manifold 309 may include a pump assembly output 341 that is arranged to discharge gas expelled from the outlets of the first and second vacuum pumps 311A, 311B to the surrounding atmosphere. In the illustrated embodiment, the pump assembly output 341 is arranged to discharge gas from a side surface of the top cap assembly 118. Alternatively, the pump assembly output 341 may be arranged to discharge gas from a top surface of the top cap assembly 118.

In the illustrated embodiment, the top cap assembly 118 includes a carrier 308 that defines a receptacle 343, such as a void, configured to receive the first and second pumps 311A, 311B as well as the pump manifold 309. The receptacle 343 may include a support surface with a sidewall extending therefrom. The carrier 308 may include an opening through which extends a spout of the water treatment system 100. The sidewall of the receptacle 343 may define at least a portion of the opening for the spout 344. The receptacle 343 may receive the first and second pumps 311A, 311B and the pump manifold 309, and may include an opening constructed to receive an inlet extension of the pump manifold 309 with a distal end terminating with the pump assembly inlet 342. A grommet 303 may provide a seal between the inlet extension of the pump manifold 309 and the receptacle 343 or to seal the inlet extension to prevent seepage of treated water from the cavity to the receptacle 343. The pump manifold 309 may also include an outlet extension that extends through a cap 315 of the top cap assembly 118 and terminates with the pump assembly outlet 341. A grommet similar to the grommet 303 may facilitate formation of a seal between the outlet extension and the cap 315, substantially preventing seepage of water or air from the surrounding atmosphere into the receptacle via the interface between the outlet extension and the cap 315.

In one embodiment, the first and second pumps 311A, 311B may be received in the receptacle 343 in a substantially adjacent relationship at a first distance in proximity to the connections to the pump manifold 309; however, at ends of the first and second pumps 311A, 311B distal from the pump connections, the first and second pumps 311A, 311B may be spaced apart at a second distance greater than the first distance. The second distance may be sufficient to provide space for the spout opening that enables the spout 344 to extend through the carrier 308 and through the cap 315 to enable discharge of treated water from the treated water reservoir 114. This positioning of the first and second pumps 311A, 311B in the receptacle 343 along with the pump manifold 309 may provide a low profile arrangement for a plurality of pumps (enabling generation of a greater pressure differential over a single pump) in the top cap assembly 118. The first and second pumps 311A, 311B may be held in place in the receptacle 343 by a cover plate 318.

The carrier 308 in the illustrated embodiment may also be configured to receive an electronic control board 322 (or PCB) which may include the controller 210, memory 214, communication interface 216, the orientation sensor 224, the pump driver circuitry 228, the pump load sensor 230, and the UV driver circuitry 220. Optionally, along with the PCB 322, the carrier 308 may receive the power source 212 (e.g., battery 314 and optional power conditioning circuitry) as well as an optional PCB retainer and retainer screws. In one embodiment, the receptacle 343 of the carrier 308 may receive the PCB 322 and the power source 212—although the present disclosure is not so limited.

The user input circuitry 222 in one embodiment, as discussed herein, may take the form of a contact switch 352 (e.g., a momentary contact switch) that can be activated by a user to initiate a water treatment procedure. The contact switch 352 may be supported by a switch carrier that is mounted to an inside surface of the cap 315 or alternatively to the carrier 308. In one embodiment, a logic level shifter may be provided to translate logic signals from one voltage generated by a component to another voltage acceptable to another component (e.g., from 5V to 3.3V or 3.3V to 5V).

In the illustrated embodiment, the top cap assembly 118 may include a spout cap 301 configured to couple to the first end opening 122 of the treated water reservoir 114. For instance, the spout cap 301 may include threads 345 configured to engage corresponding threads of the first end opening 122. With this interface, the spout cap 301 may couple to the treated water reservoir 114 in conjunction with the top cap gasket 116 to form a seal about the perimeter of the first end opening 122. In the illustrated embodiment of FIG. 4, the spout cap 301 includes an opening 346 with an internal lip 347 configured to form a perimeter seal with the UV disinfection assembly 348, enabling the UV disinfection assembly 348 to direct UV light into the cavity 121 of the treated water reservoir 114 via the first end opening 122.

The top cap assembly 118 may include a protective ring 319 configured to shield the top cap gasket 116 and the interface between the spout cap 301 and the first end opening 122. The protective ring 319 may also serve to provide a decorative aesthetic for the water treatment system 100, such as by having a different coloration or design than other components.

The spout cap 301 and its opening 346 in the illustrated embodiment may facilitate access to the cavity 121 of the treated water reservoir 114 for one or more sensors of the control system 200 and/or for the UV disinfection assembly 348. For instance, the lip 347 of the opening 346 may seal against a window 302 of the UV disinfection assembly 348 that is also an infrared permeable window, which allows a level sensor in the form of an infrared sensor to detect a level of treated water with in the treated water reservoir 114 via a TOF with respect to infrared light waves. As another example, the window 302 may enable transmission of UV light into the cavity 121 of the treated water reservoir 114. In one embodiment, the window 302 may be formed of plastic, such as acrylic glass. Alternatively, the window 302 may be formed of silica-based glass, such as crystal glass (e.g., Quartz).

The spout cap 301, as discussed herein, may include a spout 344 having a channel 362 that allows transfer of treated water from the cavity 121 of the treated water reservoir 114 to a user for consumption. The external end of the spout 344 may be sealed by a lid 317 in conjunction with a gasket 320 to facilitate formation of a vacuum in the cavity 121 of the treated water reservoir 114. The lid 317 may rotate about a hinge formed by pin receivers in the lid 317 and pin receivers in the top cap 315 and pins 325 as well as spring plungers 326. It should be understood that the present disclosure is not limited to this hinge construction and that the lid 317 may cooperate to seal the spout 344 of the spout cap 301 in a variety of ways. Alternatively, a lid 317 may not be present such that the spout 344 may seal in an alternative way, such as by folding of the spout 344 to form a watertight and gas tight seal between the channel 362 of the spout cap 301 and the surrounding atmosphere.

The illustrated embodiment, the UV disinfection assembly 348 may include a UV light source 304 disposed to generate UV light for transmission through the window 302 into the cavity 121 of the treated water reservoir 114. In one embodiment, the UV light source 304 may include a plurality of UV LEDs arranged in an annular configuration.

The UV light source 304 in the illustrated embodiment may also be arranged to provide an air gap between the UV light source and the window 302 to substantially avoid direct transfer of heat to the window 302, potentially overheating or damaging the window 302. The UV disinfection assembly 348 may also include a heatsink 306 disposed between the UV light source 304 and the carrier 308. As an example, the heatsink 306 may be an aluminum heat conductive material configured to dissipate heat energy generated by activation of the UV light source 304, thereby preventing concentration of heat energy in the UV light source 304 and extending the life thereof.

Figure 8:
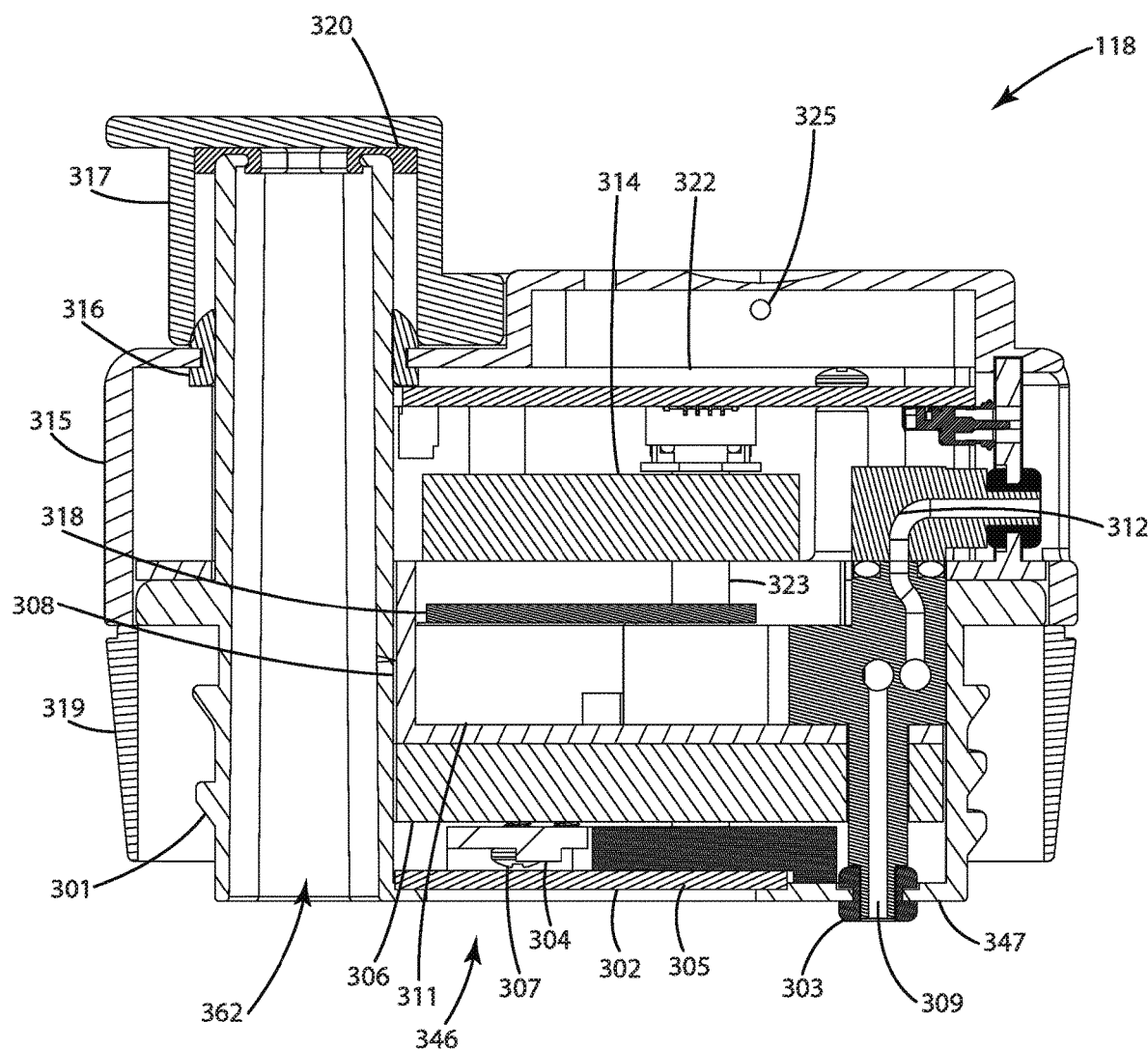
FIG. 8 shows a sectional view of the cap assembly along section lines VIII-VIII in FIG. 6.
Figure 9:
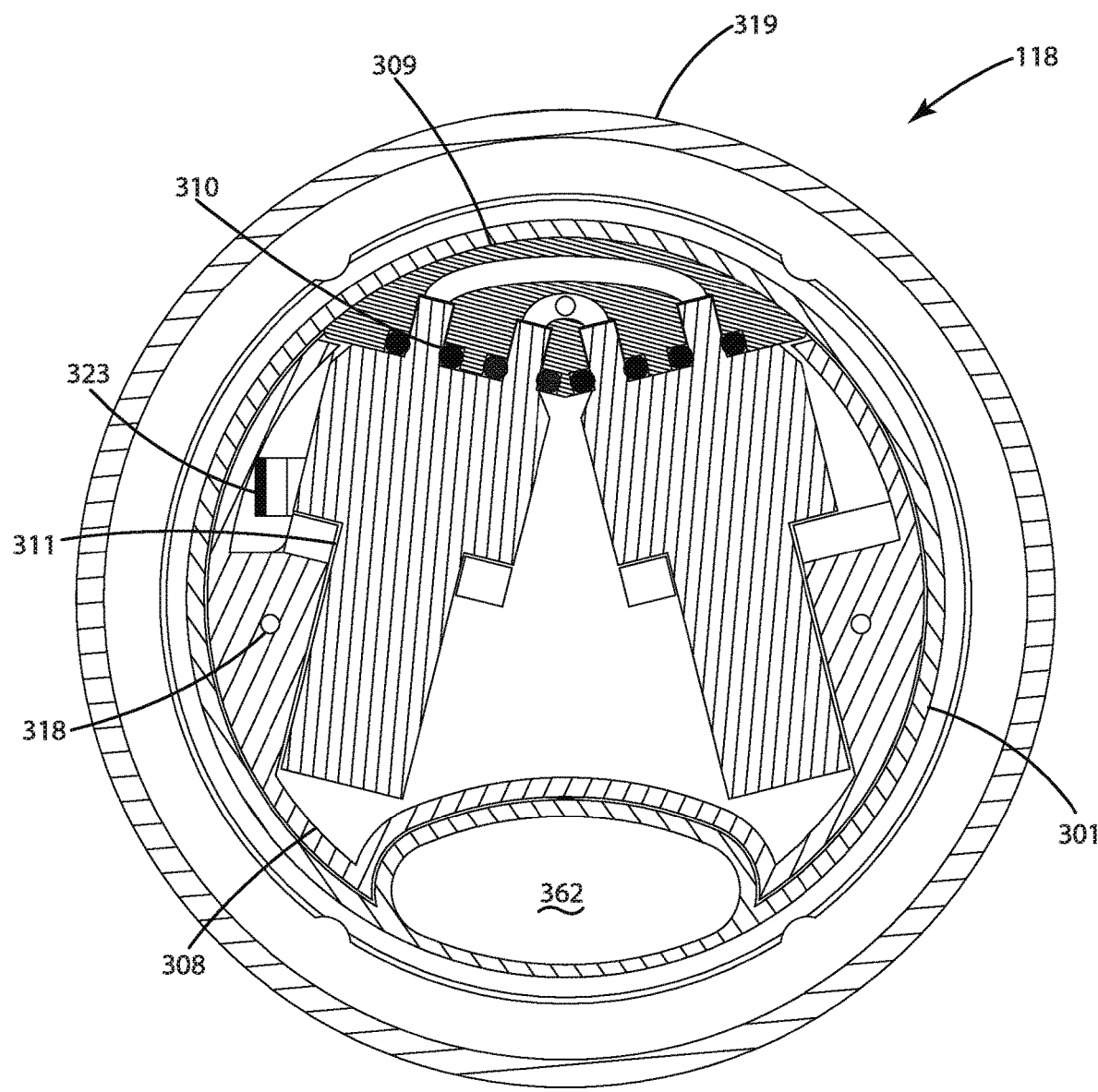
FIG. 9 shows sectional view of the cap assembly along section lines IX-IX in FIG. 7.
Figure 10:
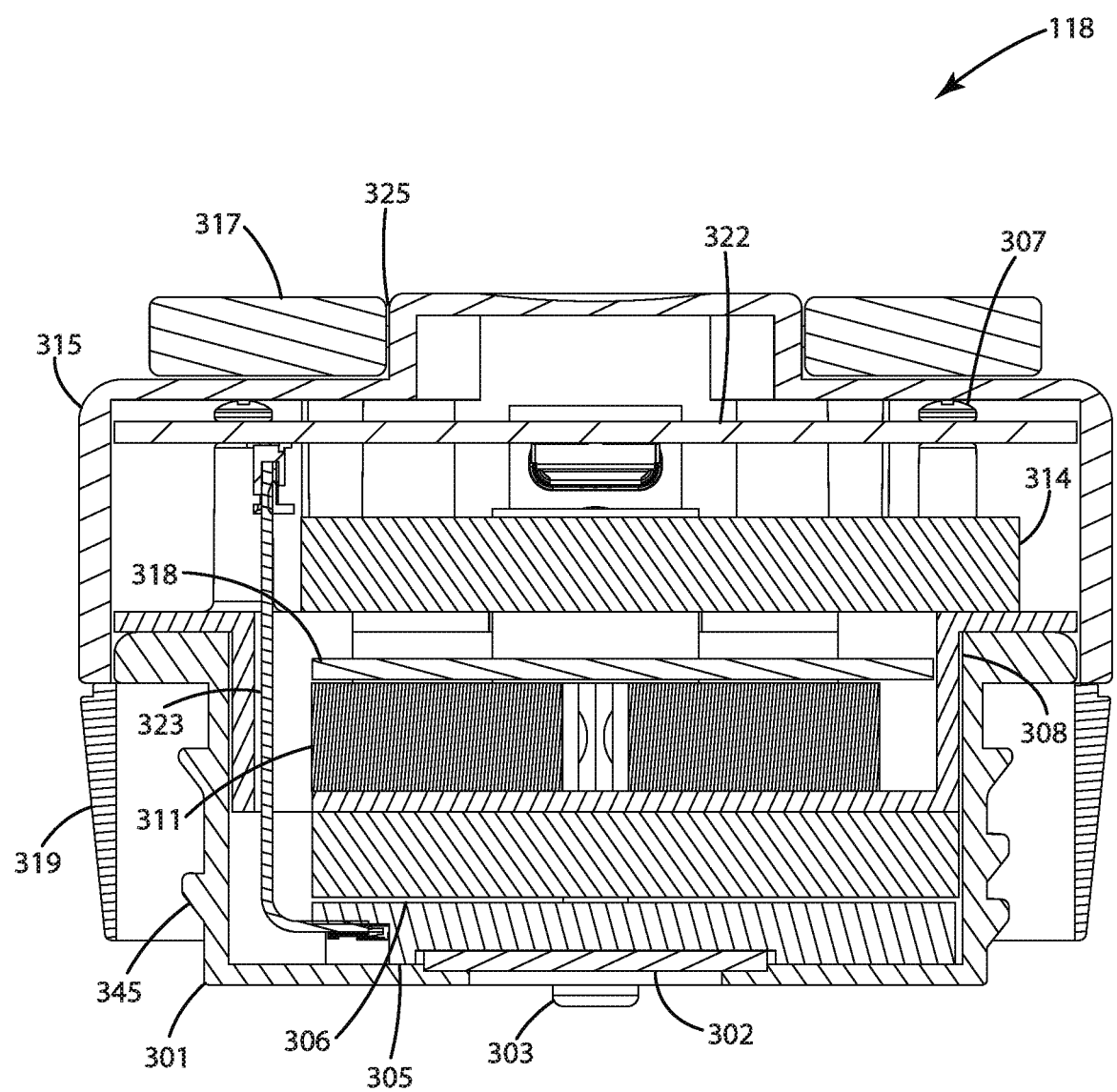
FIG. 10 shows a sectional view of the cap assembly along section lines X-X in FIG. 7.

In the illustrated embodiment, lip 347 includes an aperture that interfaces with the inlet extension of the pump manifold 309 to provide access to the pump inlet 342 to the cavity 121 of the treated water reservoir 114, as depicted in the illustrated embodiment of FIG. 8. The UV disinfection assembly 348 may also include one or more apertures that interface with the inlet extension of the pump manifold 309 to provide access to the pump inlet 342 to the cavity 121 of the treated water reservoir 114. For instance, the heatsink 306 in the illustrated embodiment of FIG. 4 include an aperture that enable passage of the inlet extension of the pump manifold 309.

The control system 200 components included on the PCB 322 may include a one or more physical connectors that provide charging and/or communication capabilities via external connections. External access to these one or more physical connectors may be provided via an aperture 350 in the top cap 315.

In the illustrated embodiment, the spout 344 of the spout cap 301 traverses through an opening of the carrier 308 as well as an opening of the top cap 315. With the lid 317 in an open state, without a sealing feature, there is a possibility that water and/or debris may make its way into internal space including the receptacle 343 via the interface between the top cap 315 and the spout 344. A seal 316, such as an O-ring gasket or seal 316, may be provided around the spout 344 between the carrier 308 in the top cap 315. In this arrangement as the components of the top cap assembly 118 are assembled, the seal 316 may form a substantially water-tight and gas tight interface between the spout 344, the carrier 308, and the cap 315.

An alternative embodiment of the top cap assembly is shown in FIGS. 17-23 and generally designated 418. It is to be understood that the top cap assembly 418 may be used in place of the top cap assembly 118 in one or more of the embodiments described herein. It is also to be understood that one or more components of the top cap assembly 418 may be incorporated into or replace aspects of the top cap assembly 118.

The top cap assembly 418 is shown exploded in accordance with one embodiment in FIGS. 17-23. The top cap assembly 418 may be similar to the top cap assembly 118 with several exceptions. For instance, the top cap assembly 418 includes a pressure control assembly 540 similar to the pressure control assembly 340, and a UV treatment assembly 548 similar to the UV treatment assembly 348. The top cap assembly 418 may be configured to removably couple to the treated water reservoir 114. The top cap assembly 418 may also be configured to fluidly seal the first end opening 122 of the treated water reservoir 114 to substantially prevent spillage of treated water from the cavity 121 of the treated water reservoir 114 and enable transfer of treated water from the cavity 121 via a discharge channel 562 to a user for consumption.

Similar to the top cap assembly 118, the top cap assembly 418 my direct treatment of water within the water treatment system 100. The top cap assembly 418 may be configured to provide access to treated water for consumption by a user and to provide vacuum assisted treatment of water for such consumption. The top cap assembly 418 may form a self-contained system for controlling water treatment via vacuum assist and discharging treated water to a user for consumption.

The top cap assembly 418, in the illustrated embodiment, includes a spout cap 501 configured to couple to the first end opening 122 of the treated water reservoir 114, similar to the spout cap 301. The top cap assembly 418 may include a variety of components similar to respective components of the top cap assembly 118, including a window 502, a rubber grommet 503, a UV light source 504, a heat sink 505, a lookdown PCB 506, screws 509, a carrier 510, screws 511, a pump manifold 512, O-rings 513, first and second pumps 514A, 514B, a carrier tray elbow 515, screws 516, a motor cover 517, screws 518, a battery 519, a PCB 520, a outer cap 522, a seal 523, a cap lid 525, pins 527, a protective ring 332, similar respectively to the window 302, the rubber grommet 303, the UV light source 304, the heat sink 306, the lookdown PCB 305, the screws 307, the carrier 308, the screws 324, the pump manifold 309, the O-rings 310, the first and second pumps 311A, 311B, the carrier tray elbow 312, the screws 313, the motor cover 318, the screws 321, the battery 314, the PCB 322, the outer cap 315, the seal 316, the cap lid 317, the pins 325, and the protective ring 319, described in conjunction with the top cap assembly 118.

The top cap assembly 418 in the illustrated embodiment includes a lid assembly 524 configured differently from the lid assembly of the top cap assembly 118. The lid assembly 524 in the illustrated embodiment includes a cap lid 525 having an integrated seal 331 operable to seal against the spout 544, as depicted more specifically in the illustrated embodiment of FIG. 20.

The top cap assembly 418 may include a magnet 528, spring plungers 526 and pins 527 disposed within a cavity of the cap lid 525 and concealed by a cover component 529, which may be secured to the cap lid 525 by screws 530. The magnet 528, as discussed herein, may be positioned when the lid assembly 524 is closed so that a spout sensor 226, such as a Hall effect sensor, can detect presence of the magnet 528. Based on the magnet 528 being present, the control system 200 may determine the spout 544 is closed or the top cap assembly 418 is in a closed state.

The top cap assembly 418 in the illustrated embodiment may include a cover 507 operable to support or hold the window 502 in position relative to the UV light source 504 and heat sink 505. Screws 508 may secure the cover 507 in place, thereby holding the window 502 in position. The cover 507 may support the window 502 alone or in conjunction with an adhesive or sealant material, such as silicone. Alternatively, the cover 507 may be absent.

In the illustrated embodiment, the top cap assembly 418 includes a seal 534 operable to facilitate formatting a seal between the top cap assembly 418 and the first end opening 122 of the treated water reservoir 114.

XII. Filter Assembly

In the illustrated embodiment of FIGS. 1 and 13-15, the filter assembly 112 can be seen in further detail. The filter assembly 112 includes filter assembly threads 130 configured to interface with internal threads 136 of the treated water reservoir 114. More specifically, in the illustrated embodiment, the hollow cylinder 126 includes threads 136 disposed on the interior surface of the hollow cylinder 126 and in proximity to the second end opening 124. An O-ring gasket 162 may be disposed in proximity to the coupling between the hollow cylinder 126 and the filter assembly 112 to facilitate formation of a substantially water tight and gas tight seal.

The filter assembly may include a treated water outlet 140 and a plurality of untreated water inlets 142. In response to a different pressure differential between the treated water outlet 140 and the untreated water inlets 142, water may flow from the untreated water inlets 142 to the treated water outlet 140 through a filter media 144 (e.g. a carbon block filter). Optionally, although not shown, one or more additional filter stages may be incorporated into the filter assembly 112, including a sediment pre-stage filter, such as a screen disposed between the untreated water inlets 142 and the filter media 144.

In the illustrated embodiment, the plurality of untreated water inlets 142 may be disposed about a perimeter of the filter assembly 112 and in close proximity to a sidewall 160 of the untreated water reservoir 110. In one embodiment, the clearance between the untreated water inlets 142 and the sidewall 160 may be approximately 0.010-0.015 inches. This relatively tight tolerance and clearance may facilitate held to seal between the two surfaces. Due at least in part to pressures from inside the bottle and environmental changes with expanding and contracting, a tight seal may help to ensure that substantially no bypass is allowed.

XIII Wiping Seal and Vacuum Assisted Operation

In the illustrated embodiments of FIGS. 13-16, the water treatment system 100 is shown in further detail in conjunction with a treatment operation. A cross-section of the water treatment system 100 is shown in FIG. 14 with a wiping seal interface 170. The wiping seal interface 170 in the illustrated embodiment may facilitate formation of a pressure differential between the untreated water reservoir 110 and the treated water reservoir 114 via vacuum assist from the pump assembly 340 of the top cap assembly 118. In the illustrated embodiment, the wiping seal interface 170 is provided between the filter assembly 112 and the interior surface of the sidewall 160 of the untreated water reservoir 110 and is formed by a O-ring, such as a Nitrile (Buna-N) O-ring suitable for use with water and abrasive resistant. Additional examples of the wiping seal interface include a quad ring and a ribbed gasket. The ribbed gasket may be constructed to adapt to changing surface finishes to facilitate maintenance of the seal. The wiping seal interface 170 may be held in a fixed position by the filter assembly 112 and move relative to the sidewall 160. Alternatively, the wiping seal interface 170 may be fixed relative to the sidewall 160 and therefore move relative to the main body 150. In another alternative embodiment, the wiping seal interface 170 may be held in a fixed position by a portion of the main body 150 other than the filter assembly 112 and move relative to the sidewall 160 in use.

Figures 15, 16:
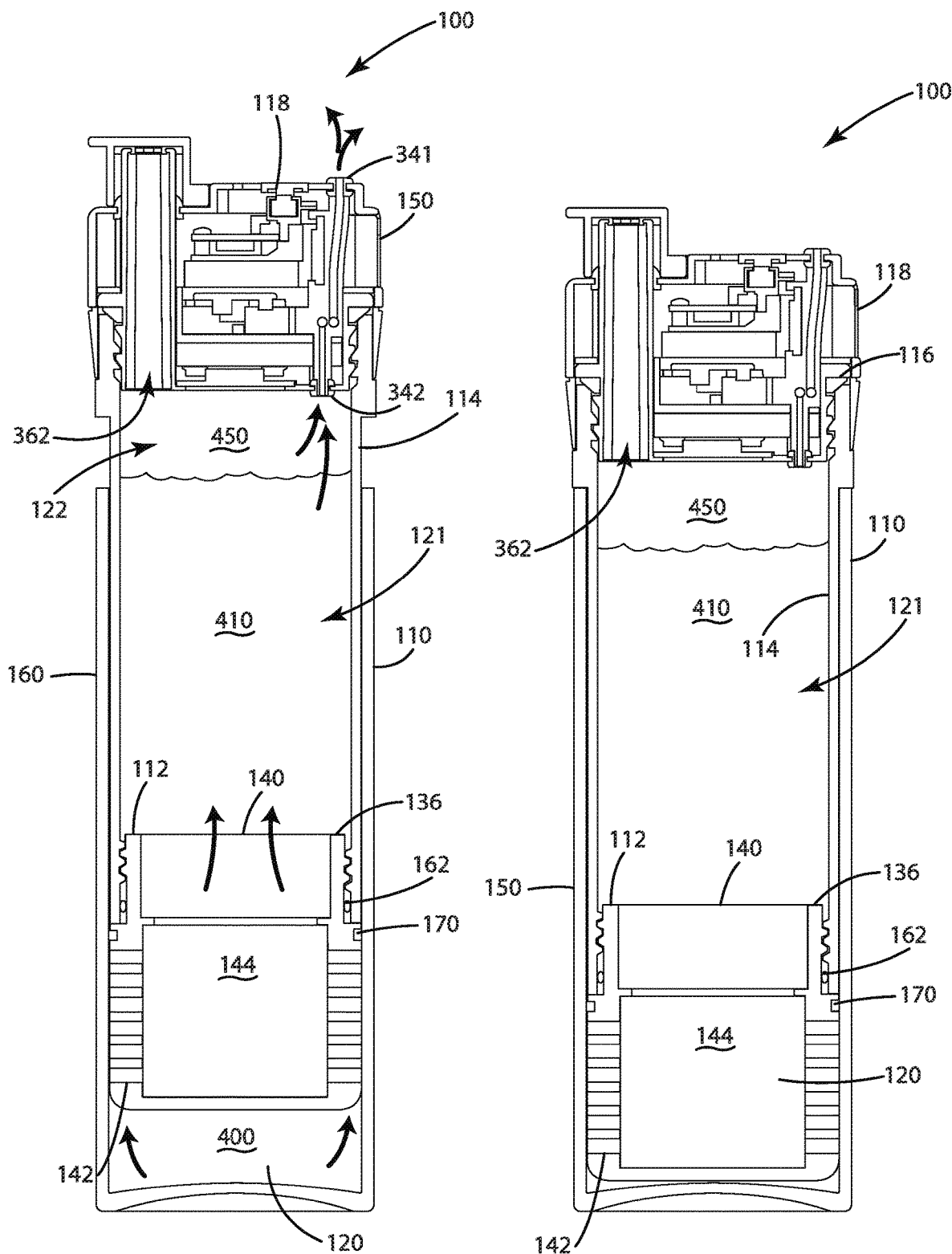
FIG. 15 shows the sectional view of FIG. 14 with the main body being further displaced from the initial position to an intermediate position.
FIG. 16 shows the sectional view of FIG. 14 with the main body being displaced further from the intermediate position of FIG. 15 to a seated position.
Figure 17:
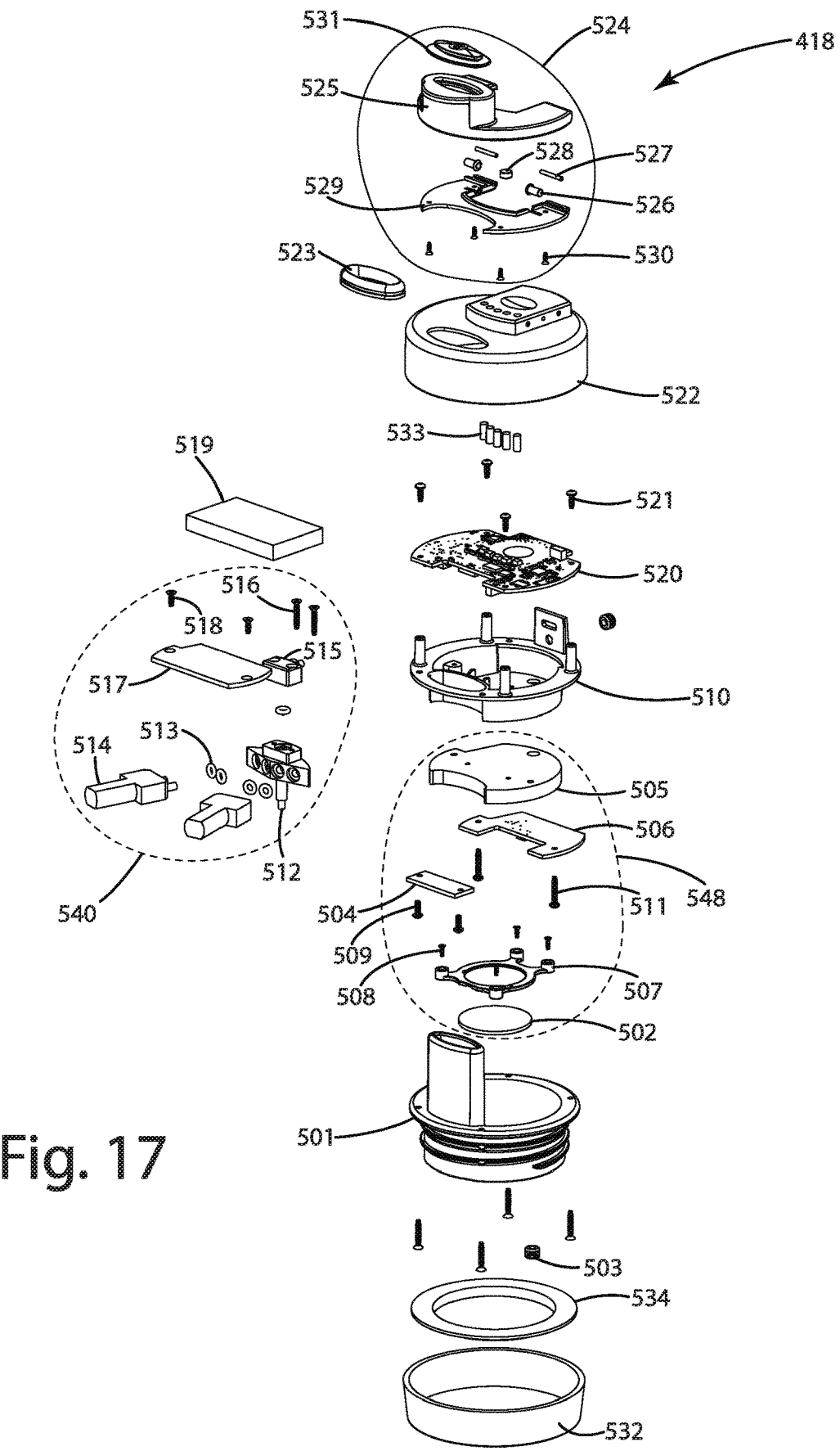
FIG. 17 shows an exploded view of a cap assembly in accordance with one embodiment.
Figure 18:
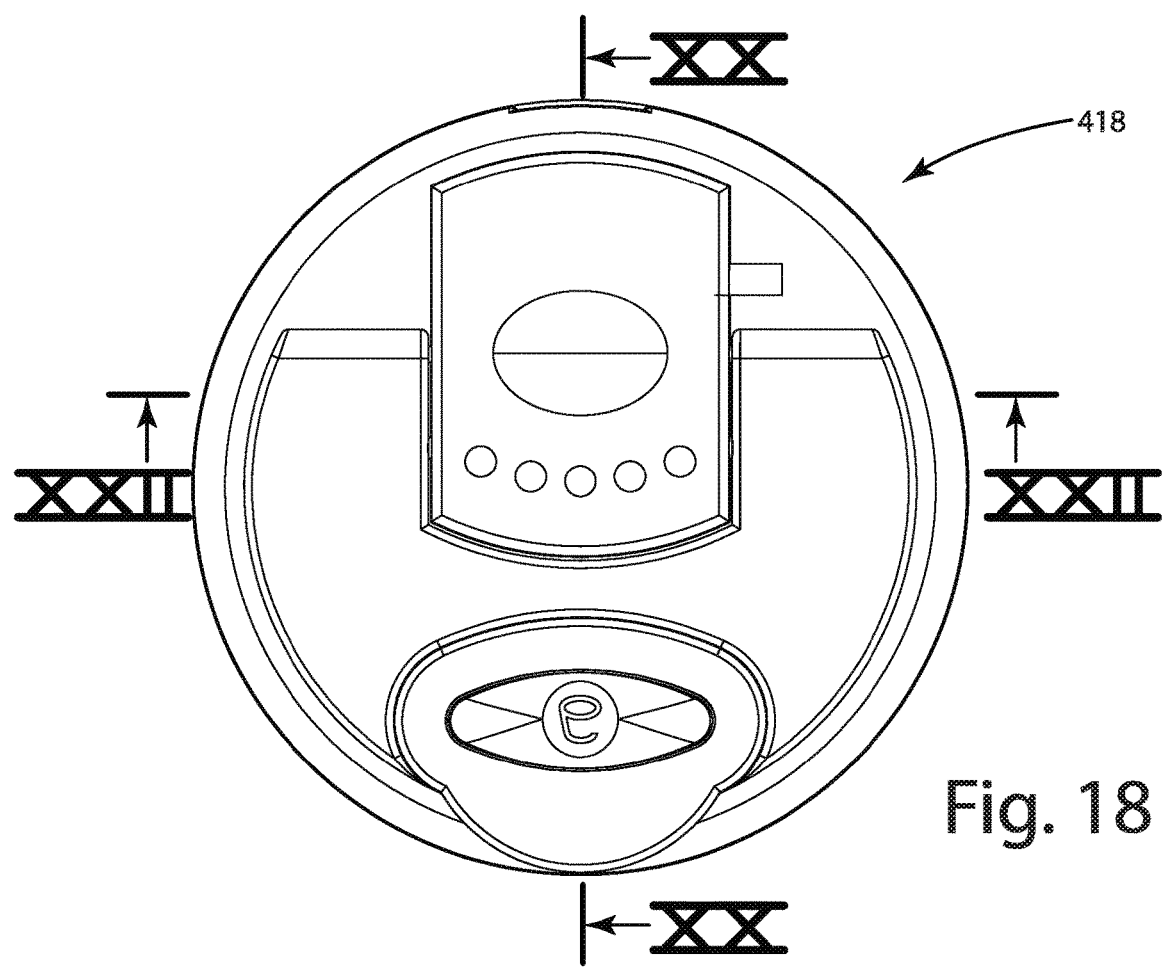
FIG. 18 shows a top view of the cap assembly of FIG. 17.
Figure 19:
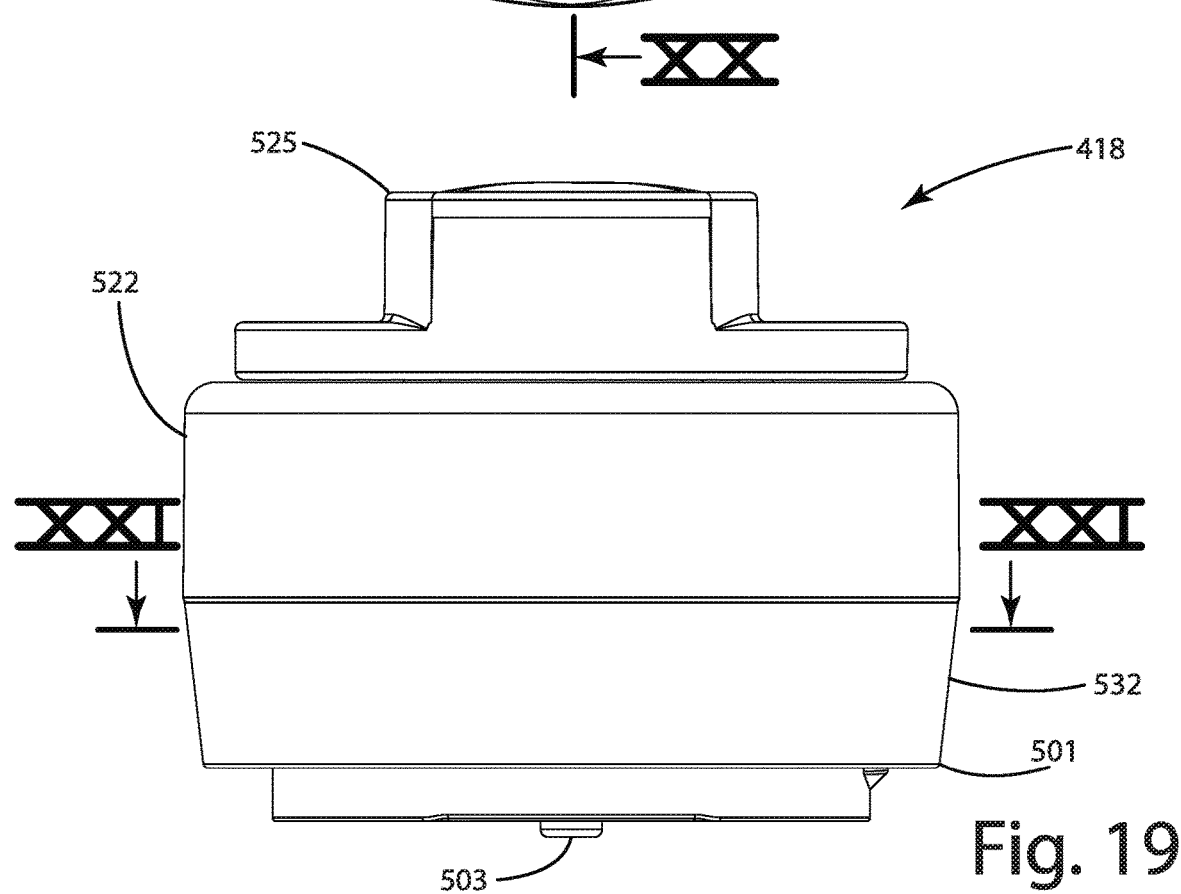
FIG. 19 shows a side view of the cap assembly of FIG. 17.
Figure 20:
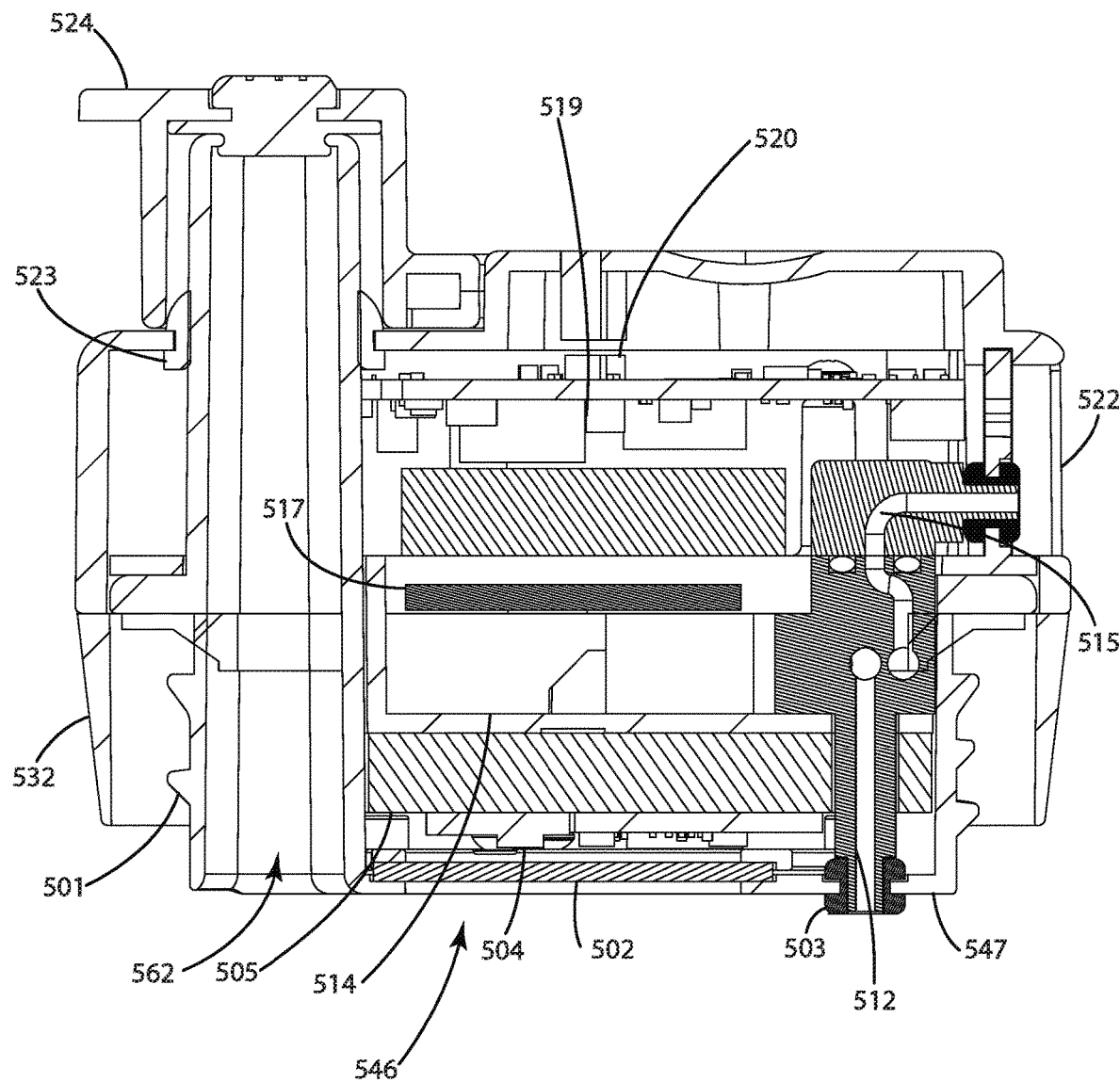
FIG. 20 shows a sectional view of the cap assembly of FIG. 18 along section line XX-XX.
Figure 21:
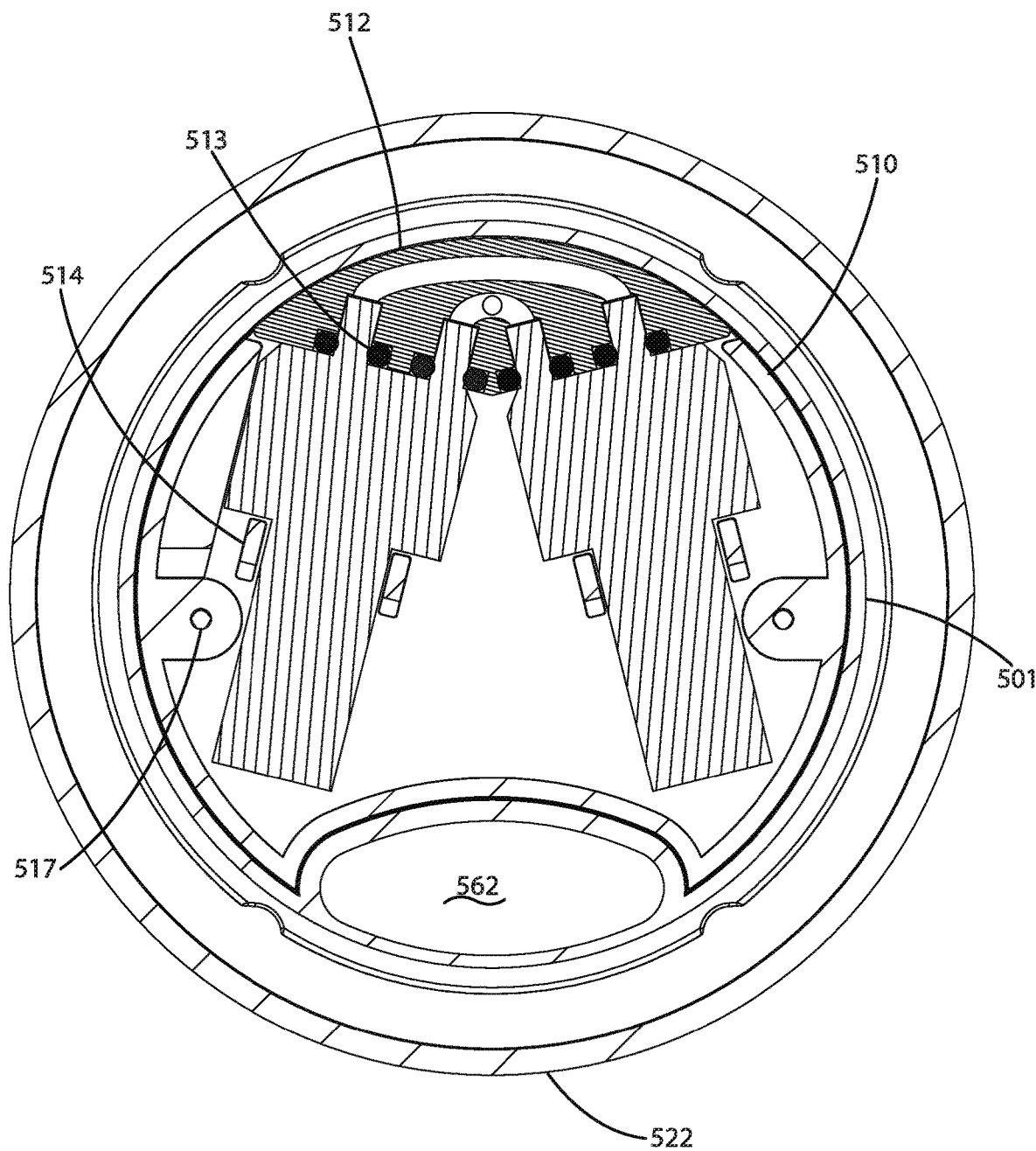
FIG. 21 shows a sectional view of the cap assembly of FIG. 19 along section line XXI-XXI.
Figure 22:
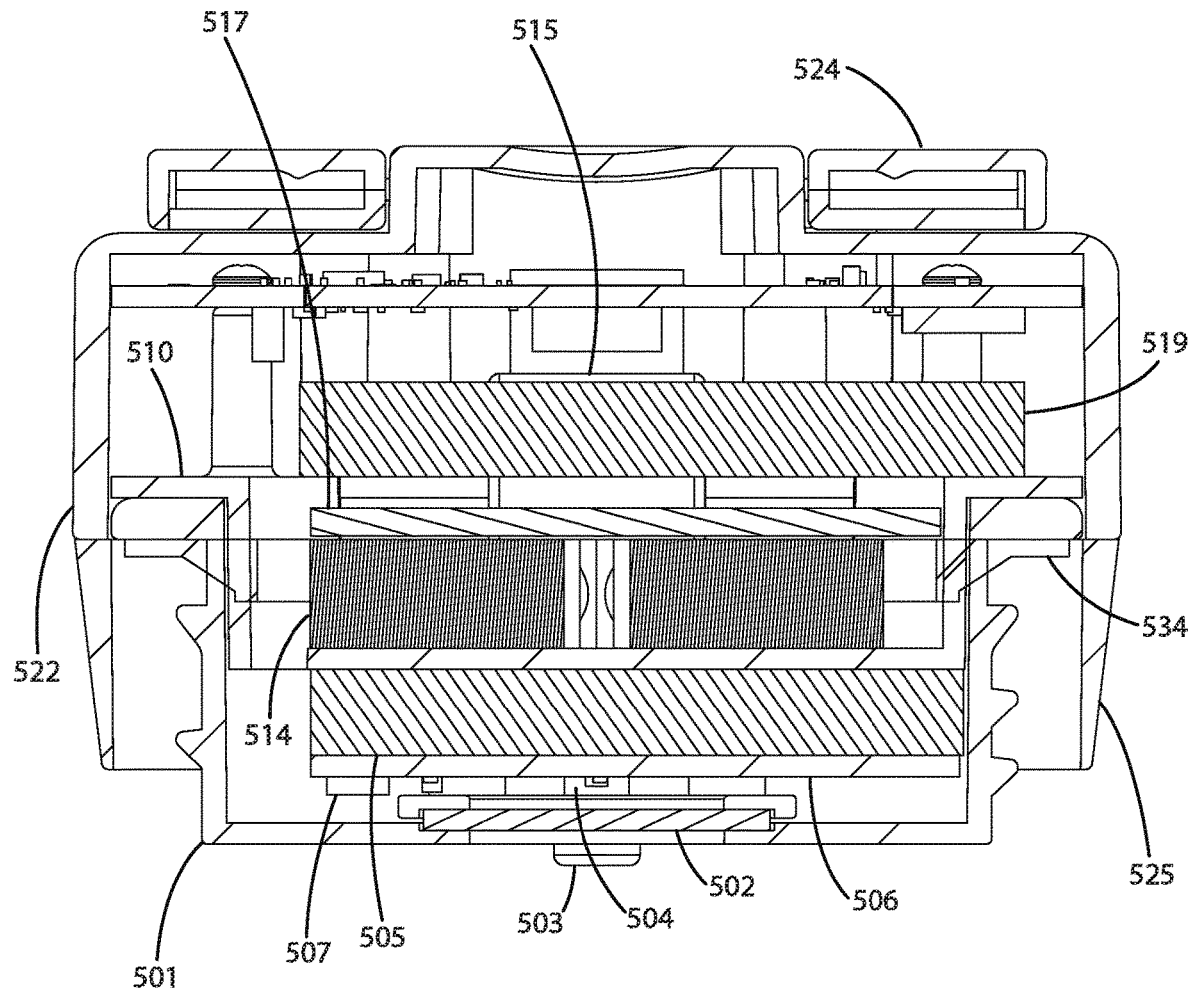
FIG. 22 shows a sectional view of the cap assembly of FIG. 18 along section line XXII-XXII.
Figure 23:
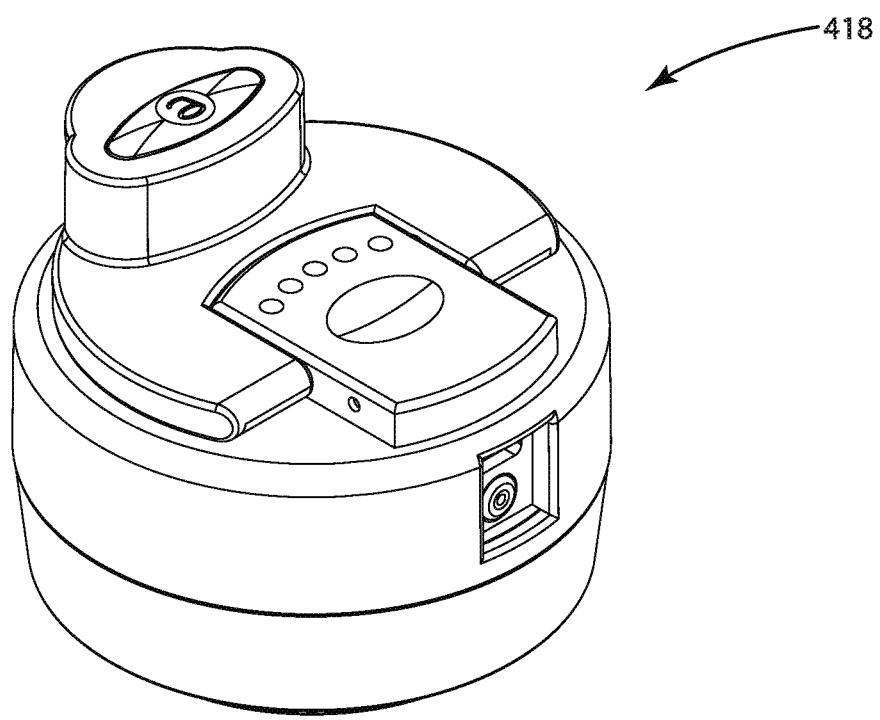
FIG. 23 shows a perspective view of the cap assembly of FIG. 17.

The wiping seal interface 170 and vacuum assisted operation in accordance with the method 1000 is depicted at various stages in FIGS. 14, 15, and 16. In the illustrated embodiment of FIG. 14, the water treatment system 100 as depicted with the untreated water reservoir 110 having been filled with untreated water 400. A user may insert the main body 150 into the cavity 121 of the untreated water reservoir 110 such that the wiping seal interface 170 engages between the sidewall 160 of the untreated water reservoir 110 and the main body 150, as shown in FIG. 14. It is noted that, in one embodiment, it is not necessary for the user to use significant force to insert the main body 150 and engage the wiping seal interface 170.

With the wiping seal interface 170 engaged, the untreated water 400 as well as any remaining gas present in the cavity 120 of the untreated water reservoir 110 may be prevented from flowing through the wiping seal interface 170 into the surrounding atmosphere. At this stage, the untreated water 400 as well as any remaining gas may flow substantially only through the filter assembly 112 into the cavity 121 of the treated water reservoir 114. The user may move the lid 317 to the closed position over the spout 344 or ensure that the lid 317 is in the closed position (such that the spout gasket 320 and the lid 317 substantially seal the discharge channel 362 and so that the spout 344 is sealed relative to the surrounding atmosphere). With the discharge channel 362 being sealed from the surrounding atmosphere and the wiping seal interface 170 engaged, both the cavity 121 of the treated water reservoir 114 and the cavity 120 of the untreated water reservoir may be substantially sealed relative to the surrounding atmosphere. The user, at this point, may initiate a water treatment procedure through activation of a switch of the user feedback circuitry 222.

Based on initiation of a water treatment procedure, and one or more conditions being satisfied (e.g., orientation and fluid level being consistent with readiness for treating water), the control system 200 may direct the pump driver circuitry 228 to begin generation of a vacuum in the cavity 121 of the treated water reservoir 114. Gas 450 present within the cavity 121 may be sucked through the pump inlet 342, through the pump manifold 309 and the first or second vacuum pump 311A, 311B, and discharged through the pump outlet 341. As the gas 450 is discharged from the cavity 121 of the treated water reservoir 114, a pressure differential may develop between the cavity 121 of the treated water reservoir 114 and the cavity 120 of the untreated water reservoir 110. The fluids and gases within the cavity 120 may traverse through the filter assembly 112 in an effort to equalize the pressure differential, thereby resulting in displacement of the main body 150 into the cavity 120 of the untreated water reservoir 110.

Traversal of the untreated water 400 through the filter assembly 112 may result in treatment or removal of one or more contaminants from the untreated water 400 such that the filter assembly discharges treated water 410 into the cavity 121 of the treated water reservoir 114. This traversal of the untreated water 400 can be seen in the illustrated embodiment of FIG. 15, with the main body 150 being displaced further into the cavity 120 of the untreated water reservoir 110 relative to the position of the main body 150 in the illustrated embodiment of FIG. 14. As the vacuum assisted process of treating the untreated water 400 and displacing the main body 150 into the cavity 120 of the untreated water reservoir 110 continues, ultimately the main body 150 may seat fully into the cavity 120 of the untreated water reservoir 110 as shown in the illustrated embodiment of FIG. 16. At this stage, the pump load sensor circuitry 230 may detect that no further pumping of gas 450 may yield additional displacement of the main body 150 or treatment of untreated water 400, and the controller 210 may de-energize the first and second pump 311A, 311B.

In one embodiment, a water treatment procedure may include the following steps. First, the outer bottle may be filled to a line specified in the cavity of the untreated water reservoir 110 with water from any municipal water source. Next, the main body 150 may be placed, with the filter assembly 112, into the cavity 120 of the untreated water reservoir 110. Confirmation may be conducted to ensure that the lid 317 is closed over the spout 344 on the top cap assembly 118 to seal the cavity 121 of the treated water reservoir 114.

Then, the control system 200 may activate the first and second vacuum pumps 311A, 311B in the cap assembly 118 in response to a user providing input via the user input circuitry 222 (e.g., by placing his finger over the top of a capacitive touch treatment button).

The creation of a vacuum by the first and second pumps 311A, 311B may cause the main body (e.g., an inner sleeve assembly with the top cap assembly 118, hollow cylinder 126, and filter assembly 112) to pull down into the cavity 120 of the untreated water reservoir (e.g., an outer bottle). This vacuum may result in filtering of the untreated water through the carbon filter 144 of the filter assembly 112 while the water passes from the untreated water reservoir 110 to the treated water reservoir 114.

The filter assembly 112 may include an O-ring seal 162 that is disposed below the threads 136, and may twist into the second end opening 124 of the treated water reservoir 114 to seal the filter assembly 112 to the inside of the inner sleeve. A wiping gasket as part of the wiping seal interface 170 may be configured to seal the outside of the filter assembly 112 to the inside surface of the untreated water reservoir 110. The movement of the main body 150 through the untreated water 400 in the untreated water reservoir 110 may be achieved by evacuating the air inside the cavity 121 or chamber inside the treated water reservoir 114, thus causing the untreated water 400 in the untreated water reservoir 110 to move through the filter assembly 112 by means of a pressure drop from atmosphere pressure in the untreated water reservoir 110 to low pressure caused by evacuating the treated water reservoir 114 of the main body 150.

The air evacuated from the treated water reservoir 114 may travel through the inlet port 342 located on the bottom of cap assembly 118 through an aperture in the window 302 or in the lip 347, or both, into the pump manifold 309.

In one embodiment, for faster filtration time, the pump manifold 309 may enable two or more pumps to be used in unison to move air from the cavity 121 of the treated water reservoir 114. The exhaust air from the first and second pumps 311A, 311B may be directed into the pump manifold 309 to the outlet port 341 and can be exhausted through the cap wall to atmosphere.

XIV. Method of Assembly

A method of assembly in one embodiment is provided to yield the water treatment system 100 in accordance with the illustrated embodiment of FIG. 1. The method of assembly may include a top cap assembly 118 assembled with one or more of the following components to achieve disinfection of water and control the vacuum system to draw the main body 150 (including the inner sleeve) into the untreated water reservoir 110 (e.g. an outer bottle).

The vacuum manifold 309 may receive four O-rings 310 constructed to seal the first and second vacuum pumps 311A, 311B and their respective inlet and outlet ports to the vacuum manifold 309. The vacuum pump assembly 340 may then be placed into the carrier 308 with the inlet port 342 of the vacuum pump assembly 340 being placed through an opening or hole in the bottom of the carrier 308. The vacuum pump assembly 340 may be held into the carrier 308 with the motor cover 318 by placing two screws 321 through the motor cover 318 and turning them into the carrier 308.

Next a carrier tray elbow 312 may be assembled to the top of the vacuum manifold 309. A rubber grommet 303 may be inserted into a receiving detail on the vertical surface on the top of the carrier 308. An O-ring 310 may be placed onto the receiving detail on the top of the vacuum manifold 309. The carrier tray elbow 312 may be inserted into the rubber grommet 303 with the detail of the O-Ring receiver on the carrier tray elbow 312 seating on the O-Ring 310. First and second screws 313 may be placed through the carrier tray elbow 312 and threaded into the vacuum manifold 309 to seal the carrier tray elbow 312 to the vacuum manifold 309. The wires that power the first and second vacuum pumps 311A, 311B may be routed up along the motor cover 318 and pushed to the side for later attachment to the PCB 322.

Next a ribbon cable 323 may be attached to the bottom of the PCB 322. The battery 314 may be placed under the PCB 322 and held in place temporarily with double face tape (not shown). The battery cable may be attached to the PCB 322. The PCB 322 and the battery 314 assembly may be placed over the mounting features of the carrier 308. The ribbon cable 323 may be routed through a wire notch past the motor cover 318, through the carrier 308. The wire connector from the first and second vacuum pump 311A, 311B may be attached to the PCB 322. Four screws 307 may be placed through the PCB 322 and screwed into the carrier 308 with bosses to hold the assembly together.

Next the UV light source 304 may be attached to the heatsink 306 (e.g., an aluminum heatsink) with two screws 307 that pass-through the UV light source 304 and turn into the bottom of the heatsink 306. A lookdown PCB 305 may be placed around the UV light source 304. The two screws 324 may be passed through the lookdown PCB 305, through the heatsink 306, and threaded into the bottom of the carrier 308, holding the UV light source 304, lookdown PCB 305, and the heatsink 306 to the bottom of the carrier 308. The ribbon cable 323 may be attached to the connector on the lookdown PCB 305.

Next the cap seal 320 may be placed into the matching opening of the cap lid 317 (e.g., an outer cap lid) and pressed all the way to the bottom until it seats against the inside surface. The cap seal 320 seals against the top surface of the spout located on the cap 301 when the outer cap lid 317 is in the closed position. The spring plunger or plungers 326 may be pressed into the receiving detail located on the cap lid 317. The seal 316 may be inserted into the outer cap 315. Confirmation that the retaining detail on the seal 316 is seated onto the wall thickness of the outer cap 315 may be performed. The cap lid 317 may be placed around the raised feature on the top of the outer cap 315 and the pins 325 may be driven through the holes in the cap lid 317 into the receiving holes of the outer cap 315.

Next the window 302 may be glued into the cap 301. The rubber grommet 303 may be pressed into the mating detail of the cap 301. The completed carrier tray assembly may be placed into the cap 301 with the vacuum inlet port 342 pressed through rubber grommet 303. Four screws 313 may be placed through the holes of the cap 301 from the bottom up through the holes in the carrier 308 and may be turned into the bosses located inside of the outer cap 315.

Next the top cap gasket 116 may be placed around the threaded portion of the cap 301 to seal the cap assembly 118 to the treated water reservoir 114. Lastly, the outer cap 315 may be placed on top of the treated water reservoir 114, and the completed cap assembly 118 may be screwed onto the first end opening 122 of the treated water reservoir 114.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s). The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A water treatment system comprising:
an untreated water reservoir having a cavity defined at least in part by a sidewall, said cavity capable of holding untreated water;
a filter assembly adapted to be disposed within said cavity of said untreated water reservoir, said filter assembly including an inlet configured to be fluidly coupled with said cavity to receive the untreated water, said filter assembly including an outlet configured to discharge treated water;
a treated water reservoir configured to store treated water discharged from said filter assembly, said treated water reservoir including a water reservoir sidewall, a first end opening, and second end opening, said second end opening of said treated water reservoir being fluidly coupled with said outlet of said filter assembly;
a pressure control assembly operably coupled to said first end opening of said treated water reservoir, said pressure control assembly configured to generate a vacuum in said treated water reservoir to facilitate treatment of the untreated water through said filter assembly to said treated water reservoir, wherein at least one of said filter assembly and said treated water reservoir move within said cavity of said untreated water reservoir in response to generation of said vacuum;
a cap including said pressure control assembly and configured to cover said first end opening of said treated water reservoir;
said cap includes a water level sensor operable to detect a level of water in said treated water reservoir;
said cap includes a controller configured to control operation of said pressure control assembly based on output from said water level sensor; and
said controller determines a seal is not formed between said untreated water reservoir and a surrounding atmosphere based on activation of said pressure control assembly to generate said vacuum and a lack of substantial change in said level of water in said treated water reservoir.

2. The water treatment system of claim 1 comprising:
a main body including said filter assembly and said treated water reservoir;
a wiping seal interface disposed between an exterior of said main body and said sidewall of said untreated water reservoir;
wherein said wiping seal interface forms a seal between an atmosphere surrounding the water treatment system and said cavity of said untreated water reservoir; and
wherein generation of said vacuum in conjunction with said seal yields displacement of said main body into said cavity of said untreated water reservoir and transfer of the untreated water through said filter assembly to said treated water reservoir.

3. The water treatment system of claim 1 wherein said controller is configured to determine treatment of said treated water via vacuum assist is complete based on sensor output from at least one of said water level sensor and a pump load sensor.

4. The water treatment system of claim 3 wherein said controller is configured to determine treatment is complete based on sensor output from said water level sensor being indicative that a water level in said treated water reservoir is substantially unchanging.

5. The water treatment system of claim 4 wherein said water level sensor is a time of flight sensor configured to determine a distance between said time of flight sensor and the treated water in the treated water reservoir, whereby said distance changes as the treated water is discharged from said filter assembly.

6. The water treatment system of claim 3 wherein said controller is configured to determine treatment is complete based on sensor output from said pump load sensor.

7. The water treatment system of claim 6 wherein said sensor output from said pump load sensor being below a threshold is indicative of treatment being complete.

8. The water treatment system of claim 1 wherein said pressure control assembly includes at least one vacuum pump operably coupled to a vacuum manifold, said vacuum manifold having a reservoir intake in communication with said at least one vacuum pump and an exhaust port configured to discharge gas obtained from said treated water reservoir via said reservoir intake.

9. The water treatment system of claim 8 wherein said cap includes an accelerometer, wherein said pressure control assembly is coupled to an output of said accelerometer, wherein said pressure control assembly is operable to discontinue operation in response to a determination that said output from said accelerometer is indicative of the water treatment system being substantially not upright such that a probability of treated water entering said reservoir intake is substantially increased.

10. The water treatment system of claim 1 wherein:
said cap includes a UV treatment assembly with a UV light source for disinfecting water; and
said cap includes a window disposed between at least a portion of said first end opening of said treated water reservoir and said UV light source.

11. The water treatment system of claim 1 wherein said cap includes a sealable spout fluidly coupled to said treated water reservoir and configured to discharge treated water for consumption by a user, whereby said sealable spout is configured to seal to facilitate generation of said vacuum in said treated water reservoir in conjunction with said pressure control assembly.

12. The water treatment system of claim 11 wherein said cap includes a closure sensor operable to provide an output indicative of whether said sealable spout is sealed or open for discharge of treated water for consumption.

13. A water treatment system comprising:
an untreated water reservoir having a cavity defined at least in part by a sidewall, said cavity capable of holding untreated water;
a filter assembly adapted to fit within said cavity of said untreated water reservoir, said filter assembly including an inlet configured to be fluidly coupled with said cavity to receive the untreated water, said filter assembly including an outlet configured to discharge treated water;
a treated water reservoir configured to store treated water, said treated water reservoir being fluidly coupled with said outlet of said filter assembly;
a cap having a spout for discharging the treated water stored in said treated water reservoir for consumption by a user, said cap having a pressure control assembly configured to facilitate generation of a pressure differential between said untreated water reservoir and said treated water reservoir such that the untreated water in said cavity of said untreated water reservoir flows through said filter assembly to said treated water reservoir;
said cap includes a water level sensor operable to detect a level of water in said treated water reservoir;
said cap includes a controller configured to control operation of said pressure control assembly based on output from said water level sensor;
said controller determines a seal is not formed between said untreated water reservoir and a surrounding atmosphere based on activation of said pressure control assembly to generate a vacuum and a lack of substantial change in said level of water in said treated water reservoir; and
said spout being sealable to facilitate generation of said pressure differential between said treated water reservoir and said untreated water reservoir.

14. The water treatment system of claim 13 wherein said pressure control assembly includes a vacuum pump configured to displace gas from within said treated water reservoir to generate said pressure differential between said treated water reservoir and said untreated water reservoir, and wherein said spout is sealable to prevent intake of gas into said treated water reservoir.

15. The water treatment system of claim 14 wherein said pressure control assembly includes a vacuum manifold coupled to said vacuum pump, said vacuum manifold having a gas inlet communicatively coupled with a cavity of said treated water reservoir, said vacuum manifold having a gas outlet configured to discharge gas from the water treatment system.

16. The water treatment system of claim 13 wherein said cap includes a UV treatment assembly with a UV light source.

17. The water treatment system of claim 16 wherein:
said treated water reservoir includes a cavity for storing the treated water;
said cavity of said treated water reservoir is defined at least in part by a sidewall;
said cap is operable to engage an opening of said cavity to substantially prevent spillage of the treated water; and
said cap includes a window disposed between said UV light source and said cavity with said cap operably engaged to said opening, wherein said UV light source is configured to disinfect the treated water being held in said cavity of said treated water reservoir.

18. The water treatment system of claim 13 comprising a wiping seal interface to form a seal between said cavity of said untreated water reservoir and a surrounding atmosphere.

19. The water treatment system of claim 18 wherein said wiping seal interface facilitates movement of said treated water reservoir through said cavity of said untreated water reservoir such that a volume of said cavity of said untreated water reservoir is variable in response to movement of said treated water reservoir.

20. The water treatment system of claim 18 wherein said treated water reservoir includes a hollow cylinder with a first end opening and a second end opening, wherein said cap is capable of being disposed on said first end opening, and wherein said filter assembly is capable of being disposed on said second end opening, wherein said treated water reservoir, said cap and said filter assembly define a main body of the water treatment system.

21. The water treatment system of claim 20 wherein:
an exterior surface of said main body is configured to interface with said wiping seal interface;
said pressure control assembly is capable of generating a vacuum in said cavity of said treated water reservoir;
said wiping seal interface substantially maintains said seal between the surrounding atmosphere and said untreated water reservoir; and
said vacuum in said cavity of said treated water reservoir yields said pressure differential between said cavity of said treated water reservoir and said cavity of said untreated water reservoir that is maintained at least in part by said wiping seal interface and that facilitates transfer of water from said untreated water reservoir to said treated water reservoir through said filter assembly.

22. A water treatment system comprising:
an untreated water reservoir having a cavity defined at least in part by a sidewall, said cavity capable of holding untreated water;
a main body comprising:
a filter assembly adapted to fit within said cavity of said untreated water reservoir, said filter assembly including an inlet configured to be fluidly coupled with said cavity to receive the untreated water, said filter assembly including an outlet configured to discharge treated water;
a treated water reservoir configured to store treated water, said treated water reservoir being fluidly coupled with said outlet of said filter assembly;
a pressure control assembly configured to generate a vacuum in said treated water reservoir such that a pressure differential exists between said treated water reservoir and said untreated water reservoir, whereby the untreated water that is held in said untreated water reservoir passes through said filter assembly in response to presence of said pressure differential;
a cap having a spout for discharging the treated water stored in said treated water reservoir for consumption by a user, said cap including a UV treatment assembly with a UV light source for disinfecting water;

said cap includes a water level sensor operable to detect a level of water in said treated water reservoir;

said cap includes a controller configured to control operation of said pressure control assembly based on output from said water level sensor;

said controller determines a seal is not formed between said untreated water reservoir and a surrounding atmosphere based on activation of said pressure control assembly to generate said vacuum and a lack of substantial change in said level of water in said treated water reservoir;

wherein said untreated water reservoir is configured receive a least a portion of said main body within said cavity of said untreated water reservoir; and wherein untreated water in said untreated water reservoir passes through said filter assembly into said treated water reservoir to allow displacement of said main body into said cavity of said untreated water reservoir.

23. The water treatment system of claim 22 wherein said cap includes a window disposed between an opening of said treated water reservoir and said UV light source.

24. The water treatment system of claim 22 wherein said cap includes said pressure control assembly.

25. The water treatment system of claim 24 comprising a wiping seal interface between said main body and said untreated water reservoir to form a seal between said cavity of said untreated water reservoir and a surrounding atmosphere.

* * * * *